US009436589B2

(12) United States Patent
Li et al.

(10) Patent No.: US 9,436,589 B2
(45) Date of Patent: Sep. 6, 2016

(54) INCREASING PERFORMANCE AT RUNTIME FROM TRACE DATA

(71) Applicant: Microsoft Technology Licensing, LLC, Kirkland, WA (US)

(72) Inventors: Ying Li, Bellevue, WA (US); Alexander G. Gounares, Kirkland, WA (US); Charles D. Garrett, Woodinville, WA (US); Russell S. Krajec, Loveland, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/853,769

(22) Filed: Mar. 29, 2013

(65) Prior Publication Data

US 2013/0227536 A1    Aug. 29, 2013

Related U.S. Application Data

(60) Provisional application No. 61/801,298, filed on Mar. 15, 2013.

(51) Int. Cl.
*G06F 9/45* (2006.01)
*G06F 11/36* (2006.01)
*H04L 12/26* (2006.01)
(Continued)

(52) U.S. Cl.
CPC ........... *G06F 11/3688* (2013.01); *G06F 8/443* (2013.01); *G06F 8/70* (2013.01); *G06F 9/46* (2013.01); *G06F 9/505* (2013.01); *G06F 11/1471* (2013.01); *G06F 11/323* (2013.01); *G06F 11/3466* (2013.01); *G06F 11/3495* (2013.01); *G06F 11/3612* (2013.01); *G06F 11/3636* (2013.01); *H04L 43/00* (2013.01); *G06F 11/3409* (2013.01); *G06F 11/3414* (2013.01); *G06F 11/3624* (2013.01); *G06F 2201/805* (2013.01); *G06F 2201/84* (2013.01); *G06F 2201/865* (2013.01); *G06F 2201/88* (2013.01)

(58) Field of Classification Search
None
See application file for complete search history.

(56) References Cited

U.S. PATENT DOCUMENTS 4,907,151 A    3/1990  Bartlett
5,369,570 A   11/1994  Parad
(Continued)

OTHER PUBLICATIONS

International Search Authority, International Search Report and Written Opinion, Korea Intellectual Property Office, PCT/US2013/073935, Mar. 31, 2014.
(Continued)

*Primary Examiner* — Jason Mitchell
(74) *Attorney, Agent, or Firm* — Ben Tabor; Raghu Chinagudabha; Micky Minhas

(57) ABSTRACT

An analysis system may perform network analysis on data gathered from an executing application. The analysis system may identify relationships between code elements and use tracer data to quantify and classify various code elements. In some cases, the analysis system may operate with only data gathered while tracing an application, while other cases may combine static analysis data with tracing data. The network analysis may identify groups of related code elements through cluster analysis, as well as identify bottlenecks from one to many and many to one relationships. The analysis system may generate visualizations showing the interconnections or relationships within the executing code, along with highlighted elements that may be limiting performance.

32 Claims, 10 Drawing Sheets

(51) Int. Cl.
*G06F 9/50* (2006.01)
*G06F 11/34* (2006.01)
*G06F 11/14* (2006.01)
*G06F 11/32* (2006.01)
*G06F 9/46* (2006.01)
*G06F 9/44* (2006.01)

(56) References Cited

U.S. PATENT DOCUMENTS

| | | | |
|---|---|---|---|
| 5,535,393 A * | 7/1996 | Reeve et al. | 717/149 |
| 5,606,688 A | 2/1997 | McNutt et al. | |
| 5,937,194 A * | 8/1999 | Sundaresan | 717/119 |
| 5,953,736 A | 9/1999 | O'Connor et al. | |
| 5,978,830 A * | 11/1999 | Nakaya | G06F 8/456 |
| | | | 718/102 |
| 6,059,842 A | 5/2000 | Dumarot et al. | |
| 6,158,049 A * | 12/2000 | Goodwin | G06F 8/443 |
| | | | 714/E11.2 |
| 6,195,676 B1 * | 2/2001 | Spix et al. | 718/107 |
| 6,321,204 B1 | 11/2001 | Kazami et al. | |
| 6,321,240 B1 * | 11/2001 | Chilimbi et al. | |
| 6,381,735 B1 * | 4/2002 | Hunt | 717/158 |
| 6,584,487 B1 | 6/2003 | Saboff | |
| 6,598,141 B1 | 7/2003 | Dussud et al. | |
| 6,735,687 B1 * | 5/2004 | Kok | 712/215 |
| 6,826,752 B1 * | 11/2004 | Thornley et al. | 718/100 |
| 6,856,950 B1 * | 2/2005 | Abts et al. | 703/13 |
| 6,970,805 B1 | 11/2005 | Bierma et al. | |
| 7,065,763 B1 * | 6/2006 | Martin et al. | 718/102 |
| 7,143,412 B2 | 11/2006 | Koenen | |
| 7,430,733 B1 | 9/2008 | Yaari | |
| 7,493,400 B2 * | 2/2009 | Loaiza | G06F 17/30362 |
| | | | 709/227 |
| 7,500,216 B1 * | 3/2009 | Blunno et al. | 716/104 |
| 7,580,905 B2 * | 8/2009 | Lopez-Estrada | 706/14 |
| 7,681,182 B1 | 3/2010 | Mistry et al. | |
| 7,681,188 B1 | 3/2010 | Tirumalai et al. | |
| 7,954,095 B2 * | 5/2011 | Archer | G06F 11/3495 |
| | | | 709/201 |
| 8,037,465 B2 * | 10/2011 | Tian | G06F 8/45 |
| | | | 717/131 |
| 8,132,162 B2 | 3/2012 | Peterson | |
| 8,234,105 B1 | 7/2012 | Aldrich et al. | |
| 8,336,056 B1 * | 12/2012 | Gadir | G06F 9/5027 |
| | | | 718/100 |
| 8,495,598 B2 | 7/2013 | Gounares et al. | |
| 8,543,907 B1 | 9/2013 | Roskind | |
| 8,566,804 B1 * | 10/2013 | Carrick et al. | 717/135 |
| 8,595,743 B2 | 11/2013 | Gounares et al. | |
| 8,607,018 B2 | 12/2013 | Gounares et al. | |
| 8,615,766 B2 | 12/2013 | Gounares | |
| 8,650,538 B2 | 2/2014 | Gounares | |
| 8,656,134 B2 | 2/2014 | Gounares et al. | |
| 8,656,135 B2 | 2/2014 | Gounares et al. | |
| 8,656,378 B2 | 2/2014 | Gounares et al. | |
| 8,694,574 B2 | 4/2014 | Gounares et al. | |
| 8,700,838 B2 | 4/2014 | Gounares | |
| 8,707,326 B2 | 4/2014 | Garrett | |
| 8,726,255 B2 | 5/2014 | Gounares et al. | |
| 8,752,021 B2 | 6/2014 | Li et al. | |
| 8,752,034 B2 | 6/2014 | Gounares et al. | |
| 8,789,030 B2 | 7/2014 | Gounares et al. | |
| 8,789,032 B1 * | 7/2014 | Li | G06F 8/4443 |
| | | | 717/151 |
| 8,793,669 B2 | 7/2014 | Garrett | |
| 2001/0003822 A1 | 6/2001 | Hibi et al. | |
| 2001/0056456 A1 * | 12/2001 | Cota-Robles | 709/103 |
| 2002/0019887 A1 | 2/2002 | Moore | |
| 2002/0072830 A1 * | 6/2002 | Hunt | G06F 8/443 |
| | | | 701/1 |
| 2002/0165901 A1 * | 11/2002 | Rajan | G06F 11/3409 |
| | | | 709/201 |
| 2002/0196184 A1 | 12/2002 | Johnson et al. | |
| 2002/0199179 A1 * | 12/2002 | Lavery et al. | 717/158 |
| 2003/0023576 A1 * | 1/2003 | Gilson | G06F 17/5045 |
| 2003/0056201 A1 | 3/2003 | Degenaro et al. | |
| 2003/0070161 A1 | 4/2003 | Wong et al. | |
| 2003/0088606 A1 * | 5/2003 | Miller et al. | 709/102 |
| 2003/0093408 A1 | 5/2003 | Brown et al. | |
| 2003/0145314 A1 * | 7/2003 | Nguyen et al. | 717/158 |
| 2004/0015600 A1 | 1/2004 | Tiwary et al. | |
| 2004/0054992 A1 * | 3/2004 | Nair et al. | 717/138 |
| 2004/0088699 A1 | 5/2004 | Suresh | |
| 2004/0103410 A1 * | 5/2004 | Sakai | 717/146 |
| 2004/0154019 A1 * | 8/2004 | Aamodt et al. | 718/102 |
| 2004/0194098 A1 | 9/2004 | Chung et al. | |
| 2004/0205718 A1 * | 10/2004 | Reynders | G06F 8/4441 |
| | | | 717/124 |
| 2004/0225443 A1 | 11/2004 | Kamps | |
| 2005/0041692 A1 | 2/2005 | Kallstenius | |
| 2005/0066149 A1 * | 3/2005 | Kanade | 712/1 |
| 2005/0131995 A1 | 6/2005 | Chase et al. | |
| 2005/0149697 A1 * | 7/2005 | Enright et al. | 712/214 |
| 2005/0149912 A1 * | 7/2005 | Farcy et al. | 717/124 |
| 2005/0177836 A1 | 8/2005 | Lari et al. | |
| 2005/0234974 A1 | 10/2005 | Bailey et al. | |
| 2005/0240567 A1 | 10/2005 | Klosterhalfen | |
| 2006/0005179 A1 * | 1/2006 | Kawahara | G06F 8/45 |
| | | | 717/157 |
| 2006/0005194 A1 * | 1/2006 | Kawahara | G06F 8/456 |
| | | | 718/100 |
| 2006/0013134 A1 | 1/2006 | Neuse | |
| 2006/0101033 A1 | 5/2006 | Hu et al. | |
| 2006/0101467 A1 | 5/2006 | Buco et al. | |
| 2006/0106926 A1 | 5/2006 | Kato et al. | |
| 2006/0168583 A1 * | 7/2006 | Basso et al. | 718/102 |
| 2006/0179429 A1 | 8/2006 | Eggers et al. | |
| 2006/0256805 A1 * | 11/2006 | Cho et al. | 370/431 |
| 2007/0006159 A1 | 1/2007 | Hecht et al. | |
| 2007/0079298 A1 * | 4/2007 | Tian et al. | 717/140 |
| 2007/0150895 A1 * | 6/2007 | Kurland | 718/102 |
| 2007/0157177 A1 | 7/2007 | Bouguet et al. | |
| 2007/0169002 A1 | 7/2007 | Kronlund et al. | |
| 2007/0169042 A1 * | 7/2007 | Janczewski | 717/149 |
| 2007/0214333 A1 | 9/2007 | Nijhawan et al. | |
| 2007/0220513 A1 * | 9/2007 | Hwang | 718/1 |
| 2007/0226696 A1 * | 9/2007 | Radhakrishnan et al. | 717/127 |
| 2007/0226700 A1 * | 9/2007 | Gal | G06F 8/52 |
| | | | 717/128 |
| 2007/0234002 A1 | 10/2007 | Litke | |
| 2007/0277056 A1 | 11/2007 | Varadarajan et al. | |
| 2008/0022285 A1 | 1/2008 | Cherkasova et al. | |
| 2008/0022286 A1 | 1/2008 | Chung et al. | |
| 2008/0092128 A1 | 4/2008 | Corry et al. | |
| 2008/0098180 A1 | 4/2008 | Larson et al. | |
| 2008/0104362 A1 | 5/2008 | Buros et al. | |
| 2008/0117216 A1 * | 5/2008 | Dorie | 345/475 |
| 2008/0127116 A1 | 5/2008 | Kosche et al. | |
| 2008/0127149 A1 * | 5/2008 | Kosche et al. | 717/158 |
| 2008/0163183 A1 * | 7/2008 | Li | G06F 8/456 |
| | | | 717/149 |
| 2008/0243970 A1 | 10/2008 | Schmelter et al. | |
| 2008/0288741 A1 | 11/2008 | Lee et al. | |
| 2009/0019449 A1 * | 1/2009 | Choi et al. | 718/105 |
| 2009/0125519 A1 | 5/2009 | Robison et al. | |
| 2009/0165016 A1 * | 6/2009 | Bell et al. | 718/107 |
| 2009/0177642 A1 | 7/2009 | Chung et al. | |
| 2009/0193402 A1 * | 7/2009 | Bashkansky et al. | 717/145 |
| 2009/0313600 A1 * | 12/2009 | Ayers et al. | 717/106 |
| 2010/0049941 A1 | 2/2010 | Howard | |
| 2010/0106920 A1 | 4/2010 | Anckaert et al. | |
| 2010/0115172 A1 | 5/2010 | Gillingham et al. | |
| 2010/0123717 A1 | 5/2010 | Jiao | |
| 2010/0125565 A1 | 5/2010 | Burger et al. | |
| 2010/0125838 A1 * | 5/2010 | Kuusilinna et al. | 717/158 |
| 2010/0131945 A1 | 5/2010 | Zeort | |
| 2010/0146489 A1 | 6/2010 | Ortiz | |
| 2010/0268816 A1 | 10/2010 | Tarui et al. | |
| 2010/0299671 A1 * | 11/2010 | Kinsey | 718/104 |
| 2011/0072420 A1 * | 3/2011 | Cha et al. | 717/149 |
| 2011/0088021 A1 * | 4/2011 | Kruglick | 717/149 |
| 2011/0088038 A1 * | 4/2011 | Kruglick | G06F 9/54 |
| | | | 718/104 |
| 2011/0154289 A1 * | 6/2011 | Mannarswamy et al. | 717/106 |

(56) References Cited

U.S. PATENT DOCUMENTS

| | | |
|---|---|---|
| 2011/0154300 A1 | 6/2011 | Rao et al. |
| 2011/0202907 A1* | 8/2011 | Dice et al. .................... 717/148 |
| 2011/0258608 A1* | 10/2011 | Li et al. .......... 717/127 |
| 2011/0258611 A1 | 10/2011 | Dutta et al. |
| 2011/0283263 A1 | 11/2011 | Gagliardi et al. |
| 2011/0289485 A1 | 11/2011 | Mejdrich et al. |
| 2011/0314448 A1 | 12/2011 | Biggerstaff et al. |
| 2012/0011519 A1 | 1/2012 | Ganesh |
| 2012/0159091 A1 | 6/2012 | Li et al. |
| 2012/0159116 A1 | 6/2012 | Lim et al. |
| 2012/0197868 A1 | 8/2012 | Fauser et al. |
| 2012/0222019 A1 | 8/2012 | Gounares et al. |
| 2012/0222043 A1 | 8/2012 | Gounares et al. |
| 2012/0227040 A1 | 9/2012 | Gounares |
| 2012/0233310 A1 | 9/2012 | Agarwala et al. |
| 2012/0233592 A1 | 9/2012 | Gounares |
| 2012/0233601 A1 | 9/2012 | Gounares et al. |
| 2012/0254266 A1 | 10/2012 | Printezis et al. |
| 2012/0278594 A1 | 11/2012 | Kumar et al. |
| 2012/0317371 A1 | 12/2012 | Gounares et al. |
| 2012/0317389 A1 | 12/2012 | Gounares et al. |
| 2012/0317421 A1 | 12/2012 | Gounares et al. |
| 2012/0317556 A1* | 12/2012 | Zhu .................. G06F 8/451 717/146 |
| 2012/0317557 A1 | 12/2012 | Garrett et al. |
| 2012/0317577 A1 | 12/2012 | Garrett et al. |
| 2012/0317587 A1 | 12/2012 | Garrett et al. |
| 2012/0324454 A1 | 12/2012 | Gounares et al. |
| 2013/0042156 A1 | 2/2013 | Srinivasan et al. |
| 2013/0067445 A1 | 3/2013 | Gounares et al. |
| 2013/0073523 A1 | 3/2013 | Gounares et al. |
| 2013/0073604 A1 | 3/2013 | Gounares et al. |
| 2013/0073829 A1 | 3/2013 | Gounares et al. |
| 2013/0073837 A1 | 3/2013 | Li et al. |
| 2013/0074049 A1 | 3/2013 | Gounares et al. |
| 2013/0074055 A1 | 3/2013 | Gounares et al. |
| 2013/0074056 A1 | 3/2013 | Gounares et al. |
| 2013/0074057 A1 | 3/2013 | Gounares et al. |
| 2013/0074058 A1 | 3/2013 | Gounares et al. |
| 2013/0074092 A1 | 3/2013 | Gounares et al. |
| 2013/0074093 A1 | 3/2013 | Gounares et al. |
| 2013/0080760 A1 | 3/2013 | Li et al. |
| 2013/0080761 A1* | 3/2013 | Garrett et al. ................. 713/100 |
| 2013/0081005 A1 | 3/2013 | Gounares et al. |
| 2013/0085882 A1 | 4/2013 | Gounares et al. |
| 2013/0086348 A1 | 4/2013 | Marathe et al. |
| 2013/0086564 A1* | 4/2013 | Felch ......................... 717/145 |
| 2013/0091387 A1 | 4/2013 | Bohnet et al. |
| 2013/0117753 A1 | 5/2013 | Gounares et al. |
| 2013/0117759 A1 | 5/2013 | Gounares et al. |
| 2013/0166886 A1* | 6/2013 | Sasanka et al. ............. 712/216 |
| 2013/0198729 A1 | 8/2013 | Turner et al. |
| 2013/0212594 A1 | 8/2013 | Choi et al. |
| 2013/0219057 A1 | 8/2013 | Li et al. |
| 2013/0219372 A1 | 8/2013 | Li et al. |
| 2013/0227529 A1 | 8/2013 | Li et al. |
| 2013/0227536 A1 | 8/2013 | Li et al. |
| 2013/0229416 A1 | 9/2013 | Krajec et al. |
| 2013/0232174 A1 | 9/2013 | Krajec et al. |
| 2013/0232433 A1 | 9/2013 | Krajec et al. |
| 2013/0232452 A1 | 9/2013 | Krajec et al. |
| 2013/0282545 A1 | 10/2013 | Gounares et al. |
| 2013/0283102 A1 | 10/2013 | Krajec et al. |
| 2013/0283240 A1 | 10/2013 | Krajec et al. |
| 2013/0283241 A1 | 10/2013 | Krajec et al. |
| 2013/0283242 A1 | 10/2013 | Gounares |
| 2013/0283246 A1 | 10/2013 | Krajec et al. |
| 2013/0283247 A1 | 10/2013 | Krajec et al. |
| 2013/0283281 A1 | 10/2013 | Krajec et al. |
| 2013/0298112 A1 | 11/2013 | Gounares et al. |
| 2014/0013306 A1 | 1/2014 | Gounares et al. |
| 2014/0013308 A1 | 1/2014 | Gounares et al. |
| 2014/0013309 A1 | 1/2014 | Gounares |
| 2014/0013311 A1 | 1/2014 | Garrett et al. |
| 2014/0019598 A1 | 1/2014 | Krajec |
| 2014/0019756 A1 | 1/2014 | Krajec |
| 2014/0019879 A1 | 1/2014 | Krajec et al. |
| 2014/0019985 A1 | 1/2014 | Krajec |
| 2014/0025572 A1 | 1/2014 | Krajec |
| 2014/0026142 A1 | 1/2014 | Gounares et al. |
| 2014/0040591 A1 | 2/2014 | Gounares |
| 2014/0109101 A1 | 4/2014 | Radhakrishnan et al. |
| 2014/0189650 A1 | 7/2014 | Gounares |
| 2014/0189651 A1 | 7/2014 | Gounares |
| 2014/0189652 A1 | 7/2014 | Gounares |
| 2014/0215443 A1 | 7/2014 | Voccio et al. |
| 2014/0281726 A1 | 9/2014 | Garrett et al. |
| 2014/0282597 A1 | 9/2014 | Garrett et al. |
| 2015/0032971 A1 | 1/2015 | Tian et al. |
| 2015/0082285 A1 | 3/2015 | Li et al. |
| 2015/0205588 A1 | 7/2015 | Bates et al. |
| 2015/0331720 A1 | 11/2015 | Huetter et al. |

OTHER PUBLICATIONS

Notice of Allowance dated Nov. 3, 2015 cited in U.S. Appl. No. 13/866,014.
Notice of Allowance dated Nov. 9, 2015 cited in U.S. Appl. No. 13/866,022.
Office Action dated Dec. 15, 2015 cited in U.S. Appl. No. 13/853,791.
Office Action dated Sep. 9, 2015 cited in U.S. Appl. No. 13/853,816.
Notice of Allowance dated Aug. 28, 2015 cited in U.S. Appl. No. 13/866,014.
Notice of Allowance dated Sep. 8, 2015 cited in U.S. Appl. No. 13/866,022.
U.S. Appl. No. 14/821,352, filed Aug. 7, 2015, Garrett, et al.
Narayanasamy, et al., "BugNet Continuously Recording Program Execution for Deterministic Replay Debugging", Jun. 2005, 12 pages.
U.S. Appl. No. 13/853,809, May 21, 2014, Office Action.
U.S. Appl. No. 13/853,816, Feb. 25, 2015, Office Action.
U.S. Appl. No. 13/853,791, May 12, 2014, Office Action.
U.S. Appl. No. 13/853,791, Sep. 30, 2014, Office Action.
U.S. Appl. No. 13/853,791, Jan. 29, 2015, Office Action.
U.S. Appl. No. 13/853,791, Aug. 19, 2015, Office Action.
U.S. Appl. No. 13/866,014, Sep. 12, 2014, Office Action.
U.S. Appl. No. 13/866,014, Jan. 5, 2015, Office Action.
U.S. Appl. No. 13/866,020, Aug. 29, 2014, Office Action.
U.S. Appl. No. 13/866,020, Feb. 27, 2015, Office Action.
U.S. Appl. No. 13/866,022, Aug. 15, 2014, Office Action.
U.S. Appl. No. 13/866,022, Mar. 17, 2015, Office Action.
Dong et al., Hybrid Checkpointing Using Emerging Nonvolatile Memories for Future Exascale Systems, Oct. 2004.
Erik-Svensson et. al, MPreplay Architecture Support for Deterministic Replay of Message Passing Programs on MessagePassing Many-core Processors, Sep. 2009.
Gerofi et al., Workload Adaptive Checkpoint Scheduling of Virtual Machine Replication, 2011.
International Search Authority, International Search Report and Written Opinion, Korea Intellectual Property Office, PCT/US2013/075876, Apr. 7, 2014.
Wu et. al, Error Recovery in Shared Memory Multiprocessors Using Private Caches, Apr. 1990.
Office Action dated May 23, 2016 cited in U.S. Appl. No. 13/853,791.

* cited by examiner

INCREASING PERFORMANCE AT RUNTIME FROM TRACE DATA

CROSS REFERENCE TO RELATED APPLICATIONS

This patent application claims the benefit of and priority to U.S. Provisional Patent Application Ser. No. 61/801,298 filed 15 Mar. 2013 by Ying Li, the entire contents of which are expressly incorporated by reference.

BACKGROUND

Increasing performance of a computer software application may have benefits in different scenarios. On one end of the scale, large applications that may execute in parallel on many server computers may benefit from decreased hardware costs when an application executes faster, as fewer instances of the application may be deployed to meet demand. On the other end of the scale, applications that may execute on battery-powered devices, such as mobile telephones or portable computers may consume less energy and give a better user experience when an application executes faster or otherwise has increased performance.

SUMMARY

An analysis system may perform network analysis on data gathered from an executing application. The analysis system may identify relationships between code elements and use tracer data to quantify and classify various code elements. In some cases, the analysis system may operate with only data gathered while tracing an application, while other cases may combine static analysis data with tracing data. The network analysis may identify groups of related code elements through cluster analysis, as well as identify bottlenecks from one to many and many to one relationships. The analysis system may generate visualizations showing the interconnections or relationships within the executing code, along with highlighted elements that may be limiting performance.

A settings optimizer may use data gathered from a tracer to generate optimized settings for executing an application. The optimizer may determine settings that may be applied to the application as a whole, as well as settings for individual code elements, such as functions, methods, and other sections of code. In some cases, the settings may be applied to specific instances of code elements. The settings may include processor related settings, memory related settings, and peripheral related settings such as network settings. The optimized settings may be distributed in the form of a model or function that may be evaluated at runtime by a runtime manager. In some embodiments, the optimized settings may be added to source code either automatically or manually.

A runtime system may use a set of optimized settings to execute an application. The optimized settings may have specific settings for the application, groups of code elements, individual code elements, and, in some cases, specific instances of code elements. The runtime system may detect that a code element is about to be executed, then apply the optimized settings for that code element. In some embodiments, the optimized settings may be determined by some calculation or algorithm that may be evaluated. Some optimized settings may be determined using parameters consumed by a code element as well as other parameters not consumed by the code element. The runtime system may apply settings to a process scheduler, memory manager, or other operating system component.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Analyzing Tracer Data Using Network Analysis

Figure 1:
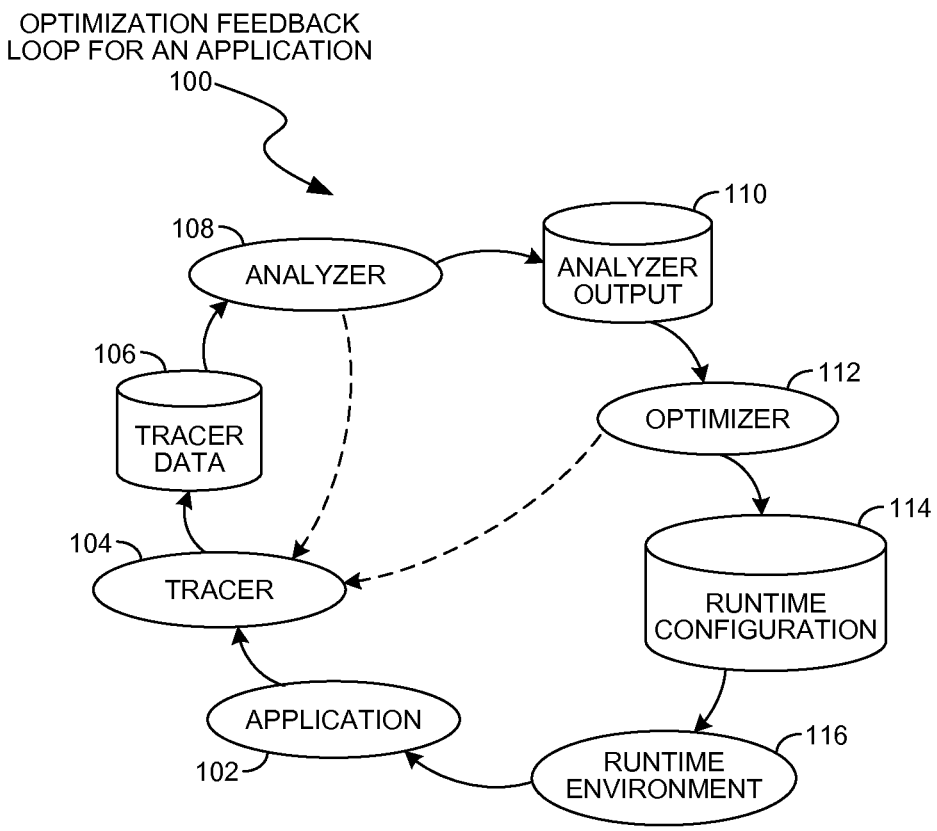
FIG. 1 is a diagram illustration of an embodiment showing a system for optimizing an application from tracing data.

An analyzer may use network analysis techniques on tracer data from an application. A tracing system may gather performance and other data while an application executes, from which relationships between code elements may be identified. The relationships may be derived from message passing relationships, shared memory objects, dependencies, spawn events, function calls, and other data that may be available. The tracing data may include performance and resource usage measurements.

The network analysis may examine the relationships between code elements and the characteristics of those relationships. In many embodiments, the relationships may include data passed over a relationship, frequency and directionality of communications, and other characteristics.

In many cases, the tracer data may include performance or dynamic data for the code elements and the relationships. For example, the tracer data may include resource consumption data for a code element, such as processor utilization, memory consumed, network or other peripheral accesses, and other data. The resource consumption may include idle time waiting for resources to become available or waiting for other code elements to complete execution. Some embodiments may include memory consumption information such as heap allocation, heap changes, garbage collection information, and other memory related data. Relationship data may include frequency and size of data passed across a relationship, speed of communication, latency, idle time, and other dynamic factors.

The network analysis may identify individual code elements or groups of code elements that may affect the performance of an application. In some cases, the analysis may identify bottlenecks, choke points, or other code elements that may have significant contributions to the performance of an application.

In many cases, the static analysis of an application may not reveal actual bottlenecks in an application. For example, a programmer may not be able to fully understand an application created with several disjointed components. However, analysis of tracer data may reveal one or more unexpected bottlenecks.

Such a situation may occur when using object oriented programming models, where different executable components may be joined together in manners that may never have been contemplated during design of the components. As such, the performance of the components themselves, as well as the overall application may be difficult to predict.

Such a situation may also occur when using functional programming models, where messages may be passed between independent sets of code and many processes spawned. The effects of spawning many processes may not be fully comprehended when an application may be under load and the bottlenecks may not be predictable when programming the application.

The network analysis may identify several categories of code elements, such as elements that are depended upon by other elements, branch points that spawn many other elements, collection points that depend on many other elements, groups of elements that frequently interact, pipelines of related code elements that may process things in series, code elements that operate largely independent of other elements, and other categories.

A programmer may use the network analysis to understand the interacting parts of an application to identify areas to improve performance, reliability, or for some other use. In some embodiments, the network analysis output may identify specific code elements that may fall in the various categories, and the programmer may refactor, improve, or otherwise improve the application in different ways.

In some embodiments, a network analyzer may perform a two-stage analysis. The first stage may collect high level performance data that may, for example, take a snapshot of various performance counters at a regular interval. A first analysis may be performed to identify candidates for deeper tracing. The second stage may gather more detailed data, such as capturing every message passed by a specific code element. The detailed data may be used for further analysis, optimization, or other uses.

Optimized Settings for Code Elements

A settings optimizer may generate optimized settings for code components of an application from tracer data. The settings optimizer may operate with an analyzer to highlight certain code elements, then determine a set of execution parameters to improve overall execution of an application. The execution parameters may be applied at runtime with an automated system, or may be manual settings that a programmer may add to executable code.

The settings optimizer may vary parameters relating to operating system-level functions, such as memory settings, processor settings, peripheral settings, and other lower level functions. In some embodiments, such functions may be made available to an application through a virtual machine, which may be a system virtual machine or process virtual machine. By varying operating system-level parameters, the settings optimizer may determine how to run an application faster or with less resources without changing the application itself.

In some cases, the settings optimizer may generate optimized parameters that may be implemented by a programmer or other human. The optimized parameters may highlight areas of an application that may be refactored, redesigned, or otherwise improved to address various issues such as performance, reliability, and other issues. In one use scenario, the settings optimizer may identify hardware and software settings that an administrator may use to determine when to deploy an application and on which hardware platform to deploy an application.

The settings optimizer may determine optimized settings using tracer data gathered while monitoring a running application. In some cases, the tracer data may be raw, tabulated data that may be processed into a mathematical model that may be used to predict the behavior of an application when a specific parameter may be changed. In other cases, the tracer data may be analyzed to find maximums, minimums, standard deviation, median, mean, and other descriptive statistics that may be used with an algorithm or formula to determine optimized settings.

The term "optimized" as used in this specification and claims means only "changed". An "optimized" setting may not be the absolute best setting, but one that may possibly improve an outcome. In many cases, a settings optimizer may have algorithms or mechanisms that may improve or change application behavior, but may not be "optimized" in a narrow definition of the word, as further improvements may still be possible. In some cases, an "optimized" setting create by a settings optimizer may actually cause performance or resource utilization to degrade. Throughout this specification and claims, the term "optimized" shall include any changes that may be made, whether or not those changes improve, degrade, or have no measurable effect.

The settings optimizer may classify a code element based in the behavior observed during tracing, then apply an optimization mechanism based on the classification. For example, the memory consumption and utilization patterns of a code element may cause a code element to be classified as one which may use a steady amount of memory but may create and delete memory objects quickly. Such a code element may be identified based on the memory usage and a set of optimized settings may be constructed that identify a garbage collection algorithm that optimizes memory consumption.

In many cases, the behavior of a code element or groups of code elements may not be known prior to running an application. In addition, the behavior may be effected by load. For example, a first code element may spawn a second code element, where the second code element may independently process a data item. While designing the software, a programmer may intend for the second code element to be lightweight enough that it may not adversely affect performance on a single processor. Under load, the first code element may spawn large numbers of the second code element, causing the behavior of the system under load to be different than may be contemplated by a programmer. An example optimized setting may be to launch the independent second code elements on separate processors as a large number of the second code element's processes may consume too many resources on the same processor as the first code element.

The settings optimizer may operate with a feedback loop to test new settings and determine whether or not the new settings had a desired effect. In such embodiments, the settings optimizer may operate with a tracer or other monitoring system to determine an effect based on a settings change. Such embodiments may use multiple feedback cycles to refine the settings.

A set of optimized settings may be stored in several different forms. In some cases, the optimized settings may be a human readable report that may include suggested settings that may be read, evaluated, and implemented by a human. In such cases, the report may include references to source code, and one embodiment may display the source code with the optimized settings as annotations to the source code.

The optimized settings may be stored in a computer readable form that may be evaluated at runtime. In such a form, the settings may be retrieved at runtime from a file or other database. Such a form may or may not include references to source code and may or may not be human readable.

Runtime Use of Analyzed Tracing Data

A runtime system may apply metadata generated from earlier tracing data to enhance the performance of a computer application. Code elements may be identified for non-standard settings during execution, then the settings applied when the code element is executed.

The code element may be a function, routine, method, or other individual code blocks to which a setting may be applied. In some cases, a library or other group of code elements may have a set of settings applied to the entire group of code elements. The code element may be a process, thread, or other independently executed code element in some embodiments.

In some embodiments, individual instances of a code element may be given different treatment than other instances. For example, an instance of a process that may be created with a specific input parameter may be given one set of execution settings while another instance of the same process with a different input parameter value may be given a different set of execution settings.

The execution settings may be generated from analyzing tracing data. The tracing data may include any type of data gathered during execution of the application, and may typically include identification of code elements and performance parameters relating to those elements.

The analysis may include identifying specific code elements that may be bottlenecks, then identifying execution settings that may cause those code elements to be executed faster. In an environment with multiple processors, some code elements may serve as dispersion points or collection points for other code elements.

In a simple example, a central or main process may spawn many independent processes that may be performed by different, independent processors. In the example, the main process may execute on a single processor and while the main process is executing, the remaining processors may be idle, awaiting the spawned processes. In such an example, the overall performance of the application may be largely affected by the performance of the main process, so any performance increases that may be realized on just the main process may dramatically increase the performance of the overall application.

Such an example may highlight that some code elements may have a greater effect on overall performance than others. Such code elements may be identified by analyzing an application as a network of code elements, where the network contains code elements that communicate with each other. Network analysis techniques may analyze dependencies between code elements to identify bottlenecks, which may include bottlenecks that spawn other processes or that may collect data or otherwise depend on multiple other processes.

The network analysis techniques may identify communication paths or dependencies between code elements, then attempt to identify execution settings that may speed up the dependencies. In some embodiments, the analysis may identify parallel dependencies where several independent processes may feed a collection point, then identify the slowest of the processes to increase performance of that process. In some such embodiments, the fastest process of the parallel processes may be identified to lower the performance of the process so that resources may be allocated to one or more of the slower processes.

Throughout this specification and claims, the terms "profiler", "tracer", and "instrumentation" are used interchangeably. These terms refer to any mechanism that may collect data when an application is executed. In a classic definition, "instrumentation" may refer to stubs, hooks, or other data collection mechanisms that may be inserted into executable code and thereby change the executable code, whereas "profiler" or "tracer" may classically refer to data collection mechanisms that may not change the executable code. The use of any of these terms and their derivatives may implicate or imply the other. For example, data collection using a "tracer" may be performed using non-contact data collection in the classic sense of a "tracer" as well as data collection using the classic definition of "instrumentation" where the executable code may be changed. Similarly, data collected through "instrumentation" may include data collection using non-contact data collection mechanisms.

Further, data collected through "profiling", "tracing", and "instrumentation" may include any type of data that may be collected, including performance related data such as processing times, throughput, performance counters, and the like. The collected data may include function names, parameters passed, memory object names and contents, messages passed, message contents, registry settings, register contents, error flags, interrupts, or any other parameter or other collectable data regarding an application being traced.

Throughout this specification and claims, the term "execution environment" may be used to refer to any type of supporting software used to execute an application. An example of an execution environment is an operating system. In some illustrations, an "execution environment" may be shown separately from an operating system. This may be to illustrate a virtual machine, such as a process virtual machine, that provides various support functions for an application. In other embodiments, a virtual machine may be a system virtual machine that may include its own internal operating system and may simulate an entire computer system. Throughout this specification and claims, the term "execution environment" includes operating systems and other systems that may or may not have readily identifiable "virtual machines" or other supporting software.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a sequence for optimizing the execution of an application based on tracer data. Embodiment 100 is an example of a sequence through which an application may be automatically sped up with or without any human intervention.

Embodiment 100 illustrates a high level sequence where data observed from executing an application may be used to generate optimized settings that may be applied to future runs of the application. The analysis and optimization steps may find specific types of patterns within the observed data, then apply optimizations based on those patterns. A runtime configuration may contain optimized parameter settings that may be applied to specific code elements, such as functions, methods, libraries. The optimized parameter settings may increase, decrease, or otherwise change various resources consumed by the code elements to maximize or minimize an optimization goal.

A simple example of a use scenario, an analyzer may identify a small set of functions within an application that cause the application to run slowly. These functions may be bottlenecks that, if sped up, may result in a large performance improvement.

The bottleneck functions may be found by analyzing an application as if the application were a network of interconnected code elements. The network may have communications that pass between code elements, and such communications may be explicit or implicit. An example of explicit communications may be messages passed within a message passing framework. An example of implicit communications may be shared memory objects that may be used to pass data from one code element to another.

In many programming technologies, the interaction between code elements may not be easily predictable. For example, many object oriented languages allow libraries of code elements to be joined together in different manners. In another example, many programming technologies allow for processes or threads to be spawned as a result of new input. The resource usage when spawning many independent processes or threads may not be predictable when writing the application.

The tracer data consumed by an analyzer may reflect observed behavior of an application. The observed behavior may show how an application actually behaves, as opposed to a static code analysis that may not show responses to loads placed on the application. In some embodiments, a system may use a combination of tracer data and static code analysis to identify various patterns and generate optimized settings for the application.

The analysis may include clustering analysis. Clustering analysis may identify groups of code elements that may be somehow interrelated, as well as identify different groups that may not be related. An optimization strategy for groups of code elements may be to place all the members of a group such that they share resources, such as processor or memory resources. The strategy may further identify groups that may be separated from each other. An example result of such analysis may place one group of code elements on one processor in one memory domain and a second group of code elements on another processor in another memory domain.

The analysis may also identify pipeline patterns. A pipeline pattern may be made up of multiple code elements that may operate in series. Once identified, a pipeline may be analyzed to determine whether one or more of the code elements may be sped up.

Parallel patterns may also be identified through network analysis. A parallel pattern may identify two or more code elements that execute in parallel, and an optimization strategy may be to attempt to speed up a laggard. In some cases, a patient code element may be identified, which may be a code element that finishes executing but waits patiently for a laggard to finish. An optimization strategy for a patient code element may be to decrease the resources assigned to it, which may free up resources to be allocated to a laggard code element.

An application 102 may be traced using a tracer 104, which may generate tracer data 106. The application 102 may be any set of executable code for which a set of optimized settings may be generated. In some cases, the application 102 may contain a main application as well as various libraries, routines, or other code that may be called from the main application. In some cases, the application 102 may be merely one library, function, or other software component that may be analyzed.

The tracer 104 may collect observations that reflect the actual behavior of the application 102. In some embodiments, a load generator may create an artificial load on the application 102. In other embodiments, the application 102 may be observed in real-world conditions under actual load.

The tracer data 106 may identify code elements that may be independently monitored. The code elements may be functions, methods, routines, libraries, or any other section of executable code. For each of the code elements, the tracer data 106 may include resource usage data, such as the amount of memory consumed, processor usage, peripheral device accesses, and other usage data. Many embodiments may include performance data, such as the amount of time to complete a function, number of memory heap accesses, and many other parameters.

The tracer data 106 may have different levels of detail in different embodiments. Some embodiments may collect data over a time interval and create summary statistics for actions over a time interval. For example, a tracer may report data every two seconds that summarize activities performed during the time period. Some embodiments may trace each memory access or even every processor-level command performed by an application. Other embodiments may have different monitoring mechanisms and data collection schemes.

A network representation of an application may be created by an analyzer 108. In one embodiment, an application may be represented by nodes representing code elements and edges representing communications or other relationships between code elements. The network may change as the application executes, with nodes being added or removed while the application responds to different inputs, for example.

The analyzer 108 may identify certain code elements, memory objects, or other elements for which additional tracer data may be useful. In some embodiments, the analyzer 108 may send a request to the tracer 104 for such additional tracer data.

The analyzer output 110 may include those code elements, memory objects, or other application elements that may be of interest. An element of interest may be any element that, if changed, may have an effect on the overall application. In many embodiments, the elements of interest may be a small portion of the overall code elements, but where improving resource usage for these elements may improve the application as a while.

An optimizer 112 may apply various optimization algorithms to the elements of interest. In many cases, an analyzer 108 may assign specific classifications to code elements that may indicate which optimization algorithm to apply. For example, an analyzer 108 may identify an outgoing star pattern and the various components of the pattern. In turn, an optimizer 112 may apply optimization algorithms to each of the labeled code elements according to their classification.

A runtime configuration 114 may be the output of an optimizer 112 and an input to a runtime environment 116. The runtime configuration 114 may identify various code elements and the runtime settings that may be applied to the code elements, which the runtime environment 116 may apply as it executes the application 102.

The runtime configuration 114 may be a database that contains a code element and its corresponding settings that may be referenced during execution. In some embodiments, the runtime configuration 114 may be a simple tabulated file with predefined settings for certain code elements. In other embodiments, the runtime configuration 114 may be a mathematical model or algorithm from which an optimized setting may be computed at runtime. In such embodiments, an optimized setting may change from one condition to another.

Embodiment 100 illustrates an optimization cycle that may use observations of application behavior to identify potential code elements for optimization. Such a system may not necessarily optimize every code element, but may identify a subset of code elements that may be bottlenecks or have some other characteristic that may be addressed at runtime to improve the application.

Figure 2:
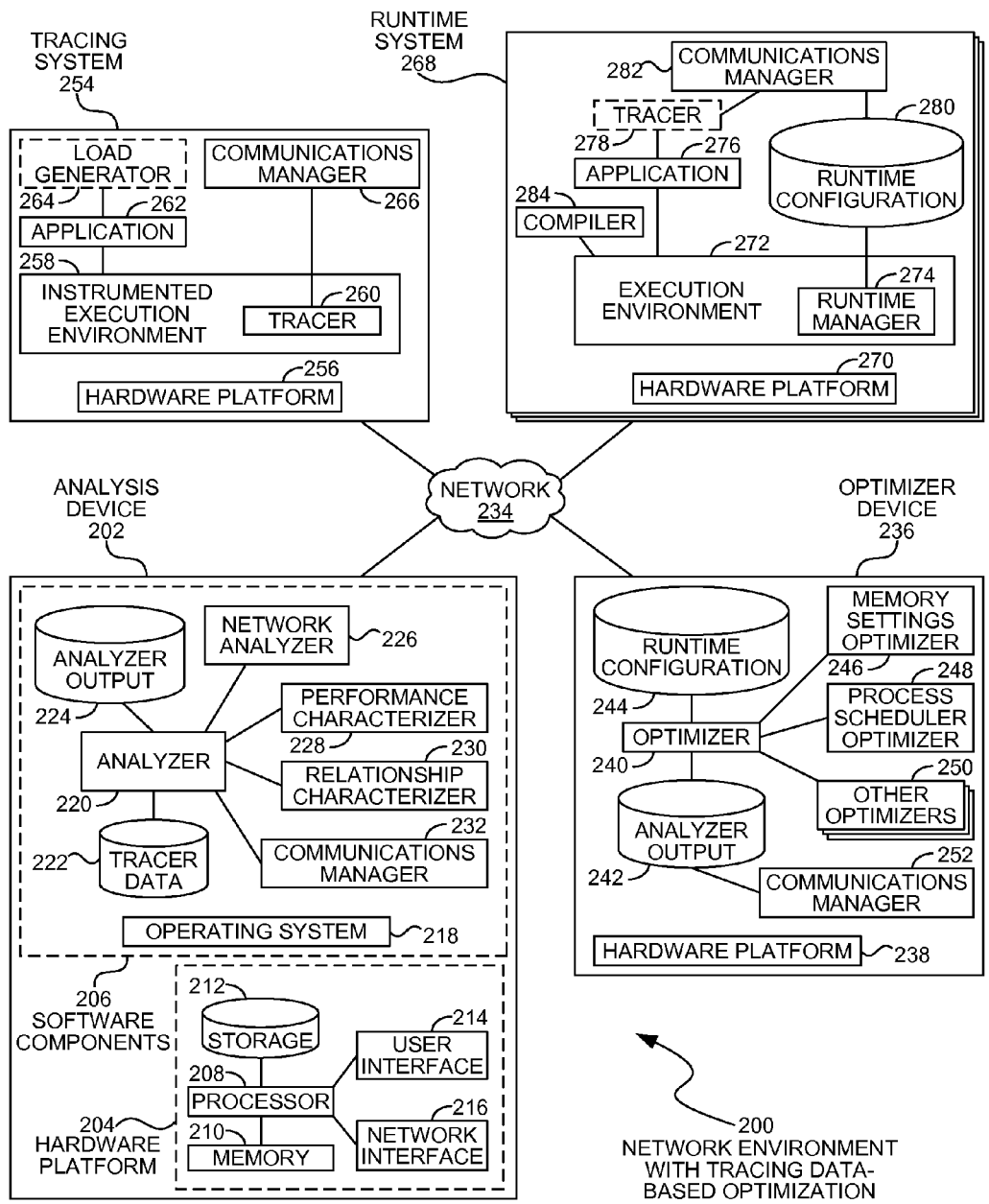
FIG. 2 is a diagram illustration of an embodiment showing a network environment for optimization from tracing data.

FIG. 2 is a diagram of an embodiment 200 showing a network environment that may optimize an application using tracing data. Embodiment 200 illustrates hardware components that may implement the process of embodiment 100 in a distributed version.

The distributed nature of embodiment 200 may use separate devices as an analysis device 202, an optimizer device 236, a runtime system 268, and a tracing system 254. In such a system, tracer data may be captured by the tracing system 254 and the optimized runtime configuration may be deployed on a runtime system 268.

One use scenario of such an architecture may be when tracing operations may use hardware or software components that may not be available on a runtime system. For example, some runtime systems may have a limited amount of computing resources, such as a mobile computing device like a mobile telephone or tablet computer. In such an example, the tracing system may be a high powered computer system that contains an emulator for the target runtime system, where the emulator may contain many more monitoring connections and other capabilities to effectively monitor and trace an application.

Such a use scenario may also test, optimize, and refine a set of runtime configuration settings during a development stage of an application, then deploy the application with an optimized runtime configuration to various users.

In some use scenarios, the tracing and analysis steps may be performed as part of application development. In such a scenario, the tracing and analysis steps may monitor an application then identify code elements that may be actual or potential performance bottlenecks, inefficient uses of resources, or some other problem. These code elements may be presented to a developer so that the developer may investigate the code elements and may improve the application.

In some embodiments, the tracing, analysis, and optimization steps may result in a set of optimized parameters that a programmer may manually incorporate into an application.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates an analysis device 202 that may have a hardware platform 204 and various software components. The analysis device 202 as illustrated represents a conventional computing device, although other embodiments may have different configurations, architectures, or components.

In many embodiments, the analysis device 202 may be a server computer. In some embodiments, the analysis device 202 may still also be a desktop computer, laptop computer, netbook computer, tablet or slate computer, wireless handset, cellular telephone, game console or any other type of computing device.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate. An operating system may provide an abstraction layer between executing routines and the hardware components 204, and may include various routines and functions that communicate directly with various hardware components.

An analyzer 220 may receive tracer data 222 and generate analyzer output 224. The tracer data 222 may be raw or preprocessed observations from a tracer that monitors an application while the application executes. The tracer data 222 may be generated from real-world or artificial loads placed on the application, and may reflect the behavior of the application and the various code elements that make up the application.

The analyzer 220 may have several components that may perform different types of analysis. For example, a network analyzer 226 may analyze the application as if the application were a network of code elements with communications and other relationships between the code elements. The network analyzer 226 may attempt to identify patterns, clusters, groups, and other characteristics from a network topology, as well as identify specific code elements that may be causing performance issues.

A performance characterizer 228 may be an analysis component that evaluates and characterizes or classifies the performance of various code elements. The classification may assist a network analyzer 226 or other component in identifying problem areas or in determining an appropriate optimization technique.

One type of characterization performed by a performance characterizer 228 may compare the performance of a particular code element to the average performance of other code elements in a single application or to the average performance of code elements observed from multiple applications. The characterization may identify outliers where code elements have above average or below average performance.

Another type of characterization from a performance characterizer 228 may identify the type or types of performance issues observed for a code element. For example, a characterization may indicate that a code element had excessive garbage collection, consumed large amounts of memory, or contended for various locks.

A relationship characterizer 230 may be an analysis component that evaluates and characterizes the relationships between code elements. The classifications may be derived from the actual behavior of the application. Examples of relationships characterizations may include message passing relationships, shared memory relationships, blocking relationships, non-blocking relationships, and other types of characterizations.

Each type of relationship may assist in classifying a code element for further evaluation or optimization. For example, a blocking relationship where one code element stalls or waits for another code element to finish may have a different optimization algorithm than a message passing relationship that may use a mailbox metaphor to process incoming messages.

The types of characterizations may reflect the underlying programming logic used for an application. For example, the relationship characterizations that may be found in a functional programming paradigm may be much different than the relationship characterizations from an object oriented programming paradigm.

A communications manager 232 may be a component that may manage communications between the various devices in embodiment 200. The communications manager 232 may, for example, retrieve tracer data 222 from the tracing system 254 and may transmit analyzer output 224 to an optimizer device 236.

In some embodiments, the communications manager 232 may automatically collect the tracer data 222 as it may become available, then cause the analyzer 220 to begin analysis. The communications manager 232 may also transmit the analyzer output 224 to the optimizer device 236 for further processing.

The optimizer device 236 may operate on a hardware platform 238, which may be similar to the hardware platform 204.

An optimizer 240 may receive analyzer output 242 and create a runtime configuration 244, which may be consumed by a runtime system 268. The optimizer 240 may have a memory settings optimizer 246, a process scheduler optimizer 248, as well as other optimizers 250.

The memory settings optimizer 246 may determine memory related settings that may be appropriate for a specific code element. The memory settings may include an initial heap size, garbage collection scheme, or other settings that may be memory related.

The process scheduler optimizer 248 may identify processor related settings for a code element. The processor related settings may include priority settings, processor affinity settings, and other settings. In some embodiments, the ordering or priority of multiple code elements may be defined. For example, a first process that has a dependency or lock on a second process may be scheduled to be executed after the second process.

The optimizer 240 may apply various optimizations based on the conditions and situations identified by the analyzer 220. Each situation may have a different optimizer algorithm that may determine runtime settings for an application. In many embodiments, the optimizer 240 may have various other optimizers 250 that may be added over time.

The optimizer device 236 may have a communications manager 252 similar to the communications manager 232 on the analysis device 202. The communications manager 252 may enable the various components in embodiment 200 to operate as a single system that may automatically trace, analyze, and optimize an application across the network 234.

A tracing system 254 may have a hardware platform 256 that may be similar to the hardware platform 204 of the analysis device. The tracing system may have an instrumented execution environment 258 in which a tracer 260 may monitor an application 262. Some embodiments may have a load generator 264, which may exercise the application 262 so that the tracer 260 may observe the application behavior under different use scenarios.

The tracing system 254 may also have a communications manager 266, which like its counterpart communication managers 232 and 252, may serve to automatically implement a sequence of gathering and analyzing tracer data.

The runtime systems 268 may represent the delivery hardware for the application 262. In some embodiments, the runtime systems 268 may have a different hardware platform 270 than the tracing system 254. For example, the instrumented execution environment 258 may be a virtual machine that may execute an operating system emulator for a mobile device, where the mobile device may be the runtime systems 268. In such an example, an application may be distributed with a runtime configuration that may allow the application to execute faster or using less resources.

The runtime system 268 may have a hardware platform 270 similar to the hardware platform 204, on which an execution environment 272 may execute an application 276. A runtime manager 274 may observe the application 276 as it executes, and may identify a code element prior to execution. The runtime manager 274 may look up the code element in the runtime configuration 280, and cause the code element to be executed with the settings defined in the runtime configuration 280.

In some embodiments, a runtime system 268 may include a tracer 278, which may collect tracer data that may be transmitted to the analysis device 202. A communications manager 282 may facilitate such a transmission, among other things.

In some embodiments, the runtime configuration 280 may be incorporated into an application 276 using a just in time compiler 284. In such an embodiment, the runtime configuration 280 may be consumed by a compiler 284 to add runtime settings to the application 276. When the application 276 may be executed, the runtime configuration settings may be embedded or otherwise incorporated into the compiled code. Such a compiler may be a just in time compiler, although in other embodiments, the compiler may be a conventional compiler that may compile code ahead of time.

Figure 3:
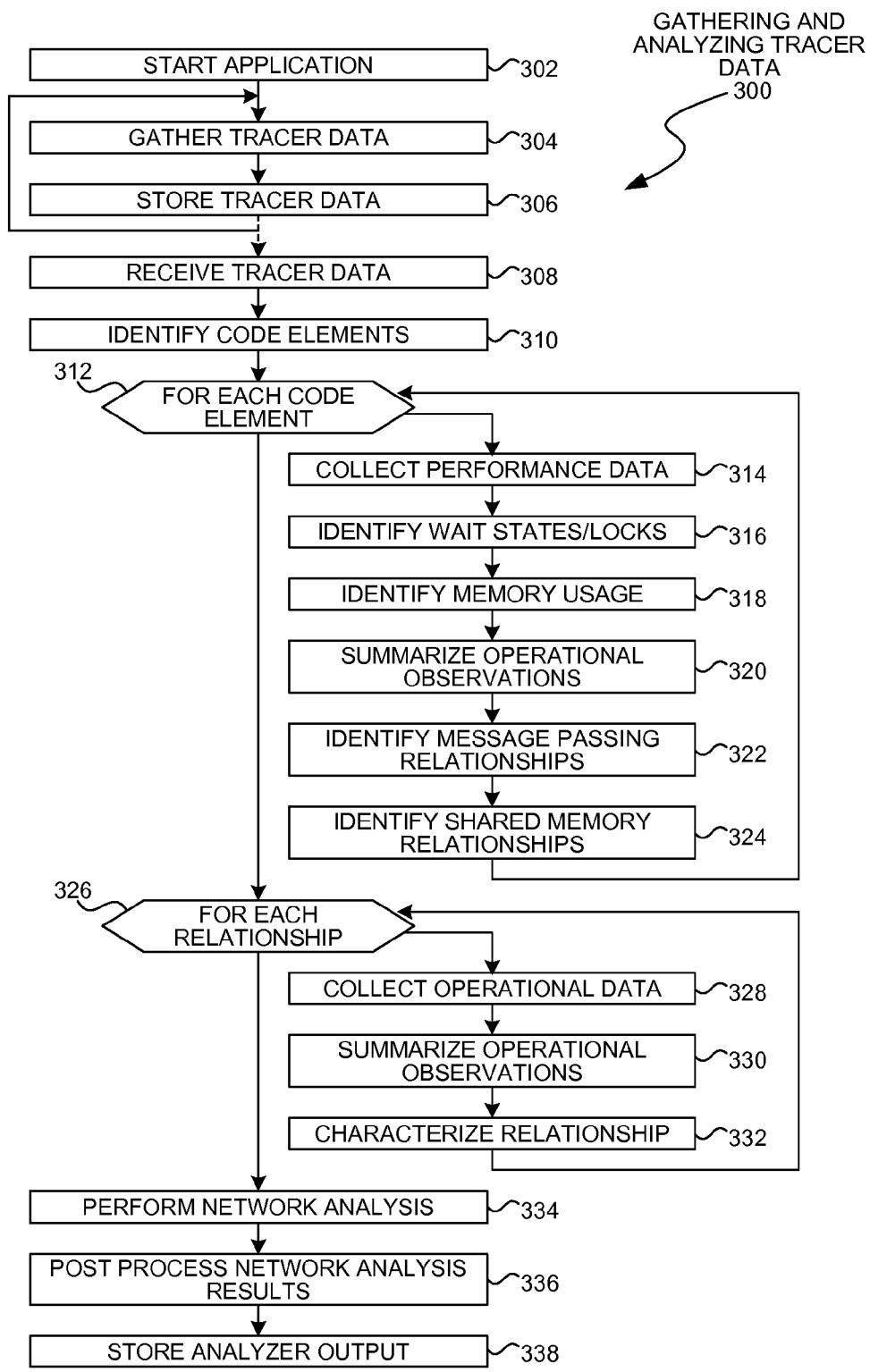
FIG. 3 is a flowchart illustration of an embodiment showing a method for gathering and analyzing tracing data.

FIG. 3 is a flowchart illustration of an embodiment 300 showing a method for gathering and analyzing tracer data. The operations of embodiment 300 may illustrate one method that may be performed by the tracer 104 and analyzer 108 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 may illustrate a generalized process for gathering and analyzing tracer data. In block 302, an application may be started. During execution, tracer data may be gathered in block 304 and stored in block 306. The process may loop continuously to gather observations about the application. In many cases, the application may be subjected to loads, which may be generated in the real world or simulated using load generators.

The analysis of the tracer data may begin in block 308 when the tracer data is received. Code elements may be identified in block 310 and then processed in block 312.

For each code element in block 312, performance data may be collected in block 314. Wait states and locks encountered by the code element may be identified in block 316, as well as memory usage in block 318. The operational observations may be summarized in block 320.

While analyzing a code element, any message passing relationships may be identified in block 322 and any shared memory relationships may be identified in block 324. Message passing relationships and shared memory relationships may link two code elements together. In some cases, a relationship may be directional, such as message passing relationships, where the directionality may be determined from tracer data. In other cases, the directionality may not be detectable from tracer data.

In some embodiments, a shared memory object may indicate a relationship. A directionality of shared memory relationships may be indicated when one code element depends on another code element. In such a case, a lock or wait state of one of the code elements may indicate that it is dependent on another code element and may therefore be the receiver in a directional relationship. In some cases, the tracer data may not have sufficient granularity to determine directionality.

Each relationship may be analyzed in block 326. For each relationship in block 326, operational data may be collected in block 328, which may be summarized in block 330 and used to characterize the relationship in block 332.

In many embodiments, a relationship may be classified using various notions of strength. A strong relationship may be one in which many messages are passed or where a large amount of data may be shared. A weak relationship may have little shared data or few messages. Some such embodiments may use a numerical designator for strength, which may be a weighting applied during network analyses.

Once the code elements and relationships have been classified, network analysis may be performed in block 334. A more detailed example of a method for network analysis may be found later in this application.

The network analysis results may be post processed in block 336 and stored in block 338.

Figure 4:
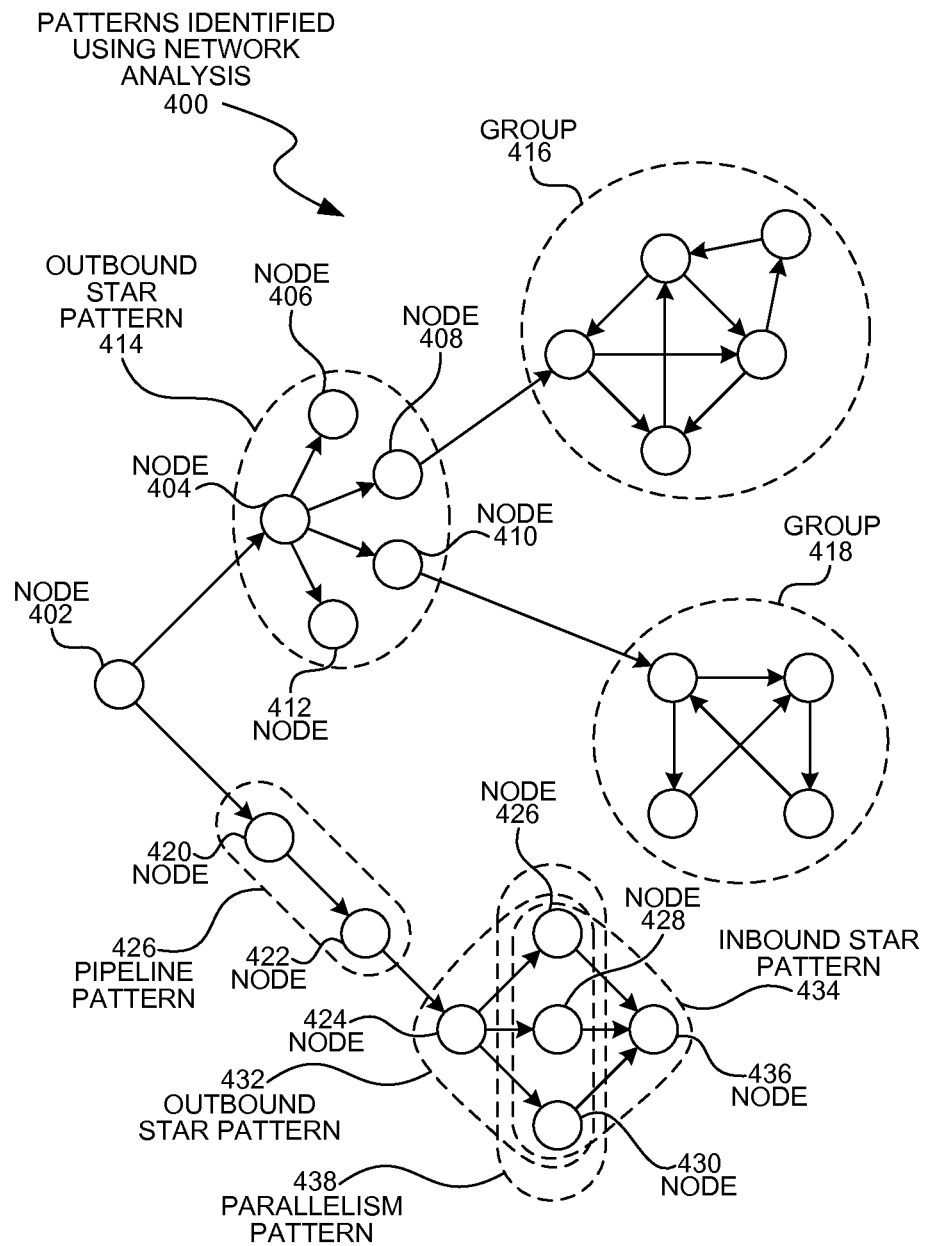
FIG. 4 is a diagram illustration of an example embodiment showing patterns that may be recognized from tracer data.

FIG. 4 is a diagram illustration of an embodiment 400 showing an example of a network analysis that may be performed using application trace data. An application may be analyzed by identifying code elements and relationships between code elements. In the example of embodiment 400, the various nodes may represent code elements and the relationships between nodes may be illustrated as edges or connections between the nodes. In the example of embodiment 400, the relationships may be illustrated as directional relationships.

Embodiment 400 is merely an example of some of the patterns that may be identified through network analysis. The various patterns may indicate different classifications of code elements, which may indicate the type of optimization that may be performed.

Node 402 may be connected to node 404, which may spawn nodes 406, 408, 410, and 412. An outbound star pattern 414 may be recognized through automatic network analysis. The outbound star pattern 414 may have a hub node 404 and several spoke nodes. In many cases, an outbound star pattern may be a highly scalable arrangement, where multiple code elements may be launched or spawned from a single element. The spoke nodes may represent code elements that may operate independently. Such spoke nodes may be placed on different processors, when available, which may speed up an application by operating in parallel.

A network analysis may also recognize groups 416 and 418. The groups may include code elements that interrelate, due to calling each other, sharing memory objects, or some other relationship. In general, groups may be identified as having tighter relationships within the group and weaker relationships outside the groups.

Groups may be optimized by combining the group members to the same hardware. For example, the members of a group may be assigned to the same memory domain or to the same processor in a multi-processor computer, while other groups may be assigned to different memory domains or other processors.

Node 402 may be connected to node 420, which may be connected to node 422, which may be connected to node 424. The series of nodes 402, 420, 422, and 424 may be identified as a pipeline pattern 426.

A pipeline pattern may be a sequence of several code elements that feed each other in series. When analyzing a pipeline pattern, one or more of the code elements may act as a bottleneck. By speeding up a slow element in a pipeline, the overall performance may increase linearly with the increase.

A pipeline pattern may also be treated as a group, where the members may be placed on the same processor or share the same memory locations. In many cases, a pipeline pattern may be identified when the relationships between the code elements are strong and may pass large amounts of data. By placing all of the pipeline members on the same processor, each member may be processed in sequence with little lag time or delay.

Node 424 may be connected to nodes 426, 428, and 430, each of which may be connected to node 436. The network analysis may identify an outgoing star pattern 432, an inbound star pattern 434, and a parallelism pattern 438.

The analysis of the outgoing star pattern 432 may be similar to the outbound star pattern 414.

An inbound star pattern 434 may indicate a bottleneck at the hub node 436, which may receive messages or share memory with several other nodes 426, 428, and 430. The degree to which node 436 may act as a bottleneck may be affected by the type of relationships. In the case where node 436 receives and processes messages from multiple nodes, the node 436 may experience a much higher workload than other nodes. As such, the amount of processing performed by node 436 may drastically affect the overall performance of an application.

The hub node of an inbound star pattern may limit the scaling of an application in a multi-processor system, as only one processor may perform the actions of node 436. As such, the hub node of an inbound star may be flagged for a programmer to consider refactoring or redesigning the code in this area.

A parallelism pattern 438 may have several processes that may operate in parallel. In applications where the receiving node 436 may depend on results from all three nodes 426, 428, and 430 before continuing execution, an optimization routine may identify the slowest node in the parallelism pattern for speed improvement.

In many cases, nodes that may be bottlenecks may be improved by applying more resources to the code element. The resources may be in the form of additional processor resources, which may be achieved by raising the priority of a code element, placing the code element on a processor that may be lightly loaded, or some other action. In some cases, the resources may be memory resources, which may be improved by increasing memory allocation, changing garbage collection schemes, or other changes.

When a parallelism pattern may be detected, some of the parallel code element may finish early and may be patiently waiting for other laggard code elements to finish. Those patent code elements may be adjusted to consume fewer resources during their operation. One such adjustment may lower the priority for a patient node or assign fewer memory resources.

Figure 5:
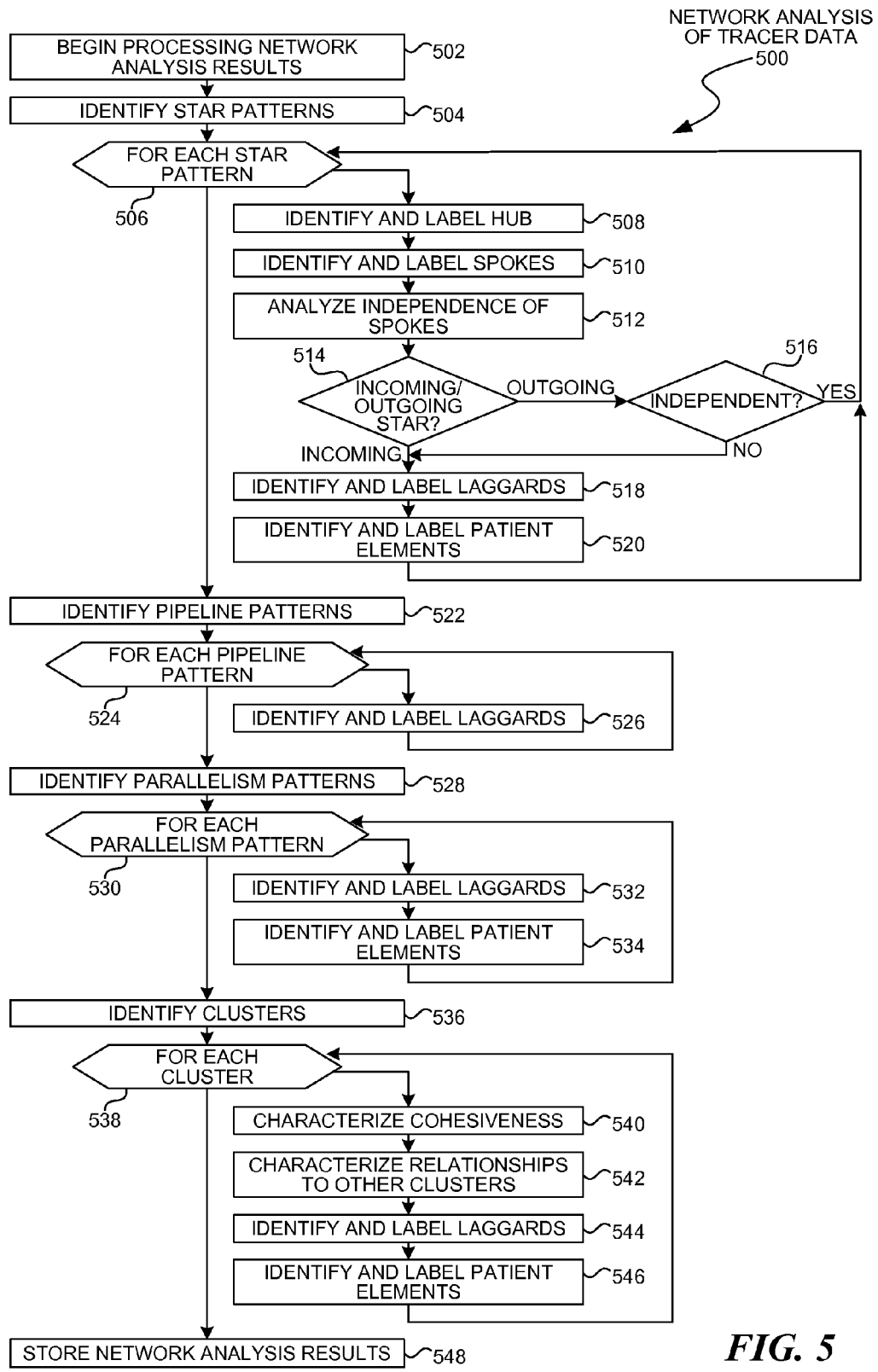
FIG. 5 is a flowchart illustration of an embodiment showing a method for network analysis of tracer data.

FIG. 5 is a flowchart illustration of an embodiment 500 showing a method for performing network analysis on tracer data. The operations of embodiment 500 may illustrate one method that may be performed during the operations of block 334 of embodiment 300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 illustrates one method for performing network analysis on a graph composed of code elements as nodes and relationships between code elements as edges. Embodiment 500 may be performed on graphs such as the example graph of embodiment 400.

The network analysis may begin in block 502 using preprocessed data that may characterize nodes and relationships as described in embodiment 300. A graph of the various components may be constructed.

From the graph, star patterns may be identified in block 504. Each star pattern may be evaluated in block 506. For each star pattern, the hub nodes may be labeled in block 508 and the spoke nodes may be labeled in block 510.

The independence of the spokes may be analyzed in block 512. When the star pattern is an outgoing star pattern in block 514 and the outbound spokes are independent in block 516, the process may return to block 506 to process another star pattern.

When the star pattern is an outgoing star pattern in block 514 and there may be no independence between the outgoing spoke nodes in block 516, the laggards of the spoke nodes may be identified and labeled in block 518, and any patient elements may be identified and labeled in block 520.

When the star pattern may be an incoming star pattern in block 514, the laggards may be identified in block 518 and the patient elements may be identified in block 520. In an incoming star pattern, the laggard and patient elements may be useful to know when the hub of the incoming star may be in a lock state waiting for all of the incoming spokes to complete their work. In an embodiment where the incoming star pattern is not dependent on all of the spoke elements, the laggard and patient elements may not be labeled, but the hub element may be labeled as an incoming hub.

In block 522, pipeline patterns may be identified. For each pipeline pattern in block 524, the laggard elements in the pipeline may be identified in block 526. The laggards may be one or more elements in a pipeline pattern that may contribute to a performance bottleneck.

Parallelism patterns may be identified in block 528. For each parallelism pattern in block 530, the laggards may be identified in block 532 and the patient elements may be identified in block 534.

Clusters may be identified in block 536. For each cluster in block 538, the cohesiveness of the cluster may be identified in block 540.

The cohesiveness may be a weighting or strength of the grouping. In some embodiments, groups with weak cohesiveness may be divided across different processors or memory domains, while groups with strong cohesiveness may be kept together on the same hardware components.

The relationships between a given cluster and other clusters may be characterized in block 542. Clusters with strong inter-cluster relationships may have a higher likelihood for remaining together, while clusters with weak inter-cluster relationships may be more likely to be split.

Within the clusters, laggards may be labeled in block 544 and patient elements may be labeled in block 546.

The network analysis results may be stored in block 548.

The stored network analysis results may be automatically consumed by an optimizer routine to generate a runtime configuration. In some embodiments, the stored network analysis results may be used by a programmer to analyze code under development. Such an analysis may assist the programmer in finding bottlenecks and other areas that may adversely affect performance of the application.

Figure 6:
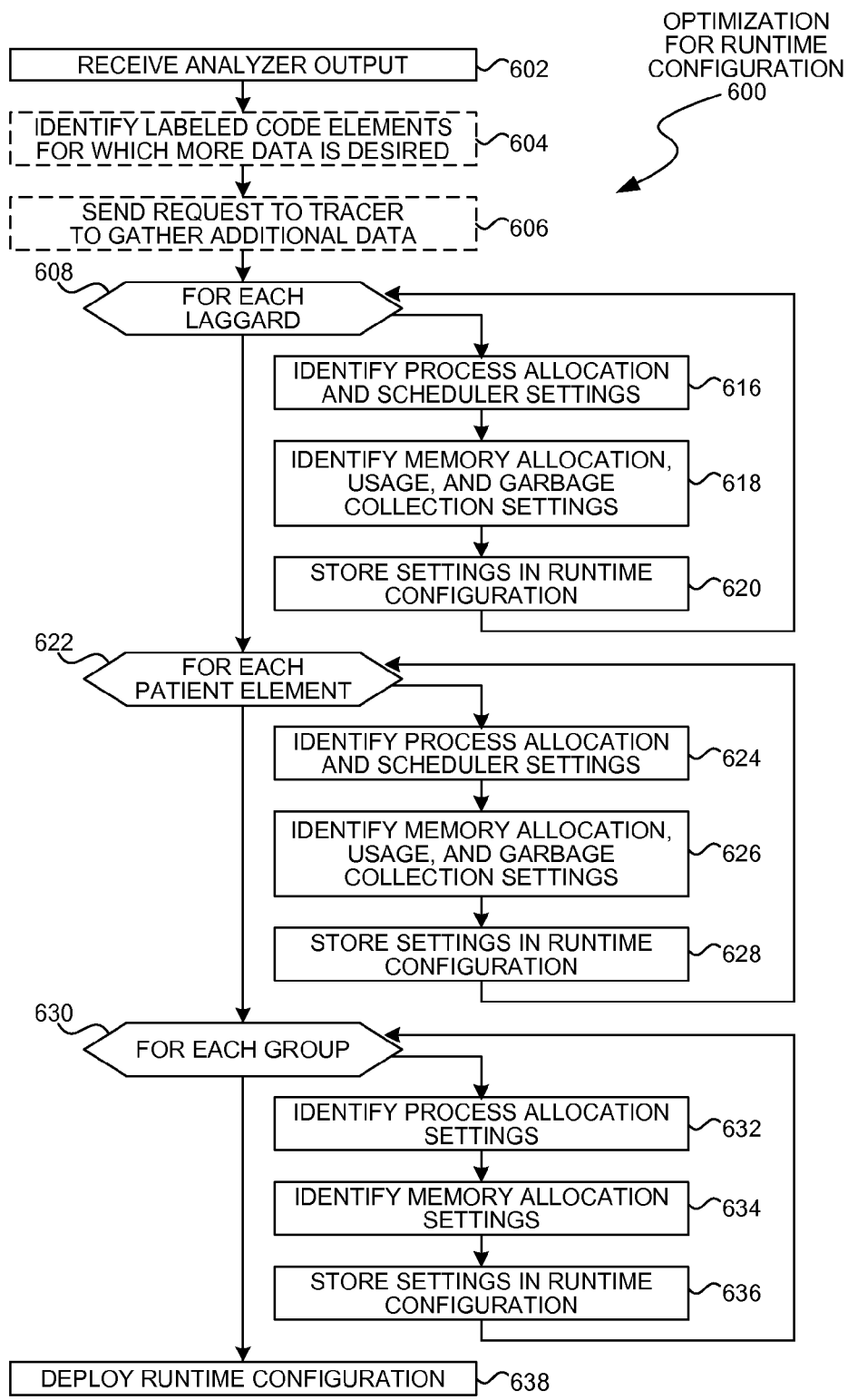
FIG. 6 is a flowchart illustration of an embodiment showing a method for optimization for runtime configuration.

FIG. 6 is a flowchart illustration of an embodiment 600 showing a method for optimizing tracer analysis results to create a runtime configuration. The operations of embodiment 600 may illustrate one method that may be performed by the optimizer 112 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 600 illustrates one method for determining runtime configurations that may be optimized derived from patterns observed during network analysis. During network analysis, some of the code elements may be identified as laggards, patient elements, as well as members of groups. Each classification of elements may be optimized by identifying parameters that may speed up certain code elements, make more efficient usage of code elements, or apply settings across groups of code elements.

The analyzer output may be received in block 602. In some embodiments, some code elements may have been labeled as requesting more data in block 604, and identifiers for those code elements may be transmitted to a tracer in block 606.

In some embodiments, additional data may be requested in order to identify optimized settings. For example, an initial tracer may capture the various code elements, relationships, and high level performance metrics. After a network analysis identifies specific code elements as being a bottleneck, those code elements may be traced again, but at a more detailed level. The second tracing pass may gather information such as memory usage details, messages passed, processor utilization, or other details from which optimized runtime configuration may be derived.

For each laggard code element in block 608, process allocation and scheduler settings may be identified in block 616. Memory allocation, usage, and garbage collection settings may be identified in block 618. The settings may be stored in a runtime configuration in block 620.

The process allocation settings may assist in placing the laggard on a specific processor. In many embodiments, the process allocation settings may include an affinity or relationship to other code elements. At runtime, code elements that may have a strong positive affinity may be placed on the same processor, while code elements that may have a strong repulsive affinity may be placed on different processors.

The scheduler settings may assist a process scheduler in determining when and how to execute the laggard. In some embodiments, the scheduler settings may indicate that one code element may be executed before another code element, thereby hinting or expressly determining an order for processing. The scheduler settings may include prioritization of the laggard. In many cases, laggards may be given higher priority so that the laggard process may be executed faster than other processes.

The memory allocation settings may relate to the amount of memory allocated to a code element as well as various settings defining how memory may be managed while a code element executes. For example, a setting may define an initial heap allocation, while another setting may define the increment at which memory may be additionally allocated. The memory related settings may include garbage collection schemes, as well as any configurable parameters relating to garbage collection.

Each patient element may be analyzed in block 622. For each patient element, process allocation and scheduler settings may be determined in block 624, and memory allocation, usage, and garbage collection settings may be identified in block 626. The settings may be stored in a runtime configuration in block 628.

With a laggard code element, the optimized settings may attempt to cause the code element to speed up. Higher prioritization, more memory, or other settings may help the code element complete its work faster, thereby causing the entire application to execute faster.

With a patient code element, the optimized settings may attempt to limit the amount of resources. For example, lowering the priority of the process may cause a patient code element to be executed slower and may free up processor resources that may be allocated to laggard processes. Such an example may illustrate efficient deployment of resources that may improve an application's performance.

Each group or cluster may be evaluated in block 630. For each group in block 630, process allocation settings may be identified in block 632 and memory allocation settings may be identified in block 634. The settings may be stored in the runtime configuration in block 636. The runtime configuration may be deployed in block 638.

For groups, the runtime settings may identify affinity between code elements such that group members may be processed on the same processor, have access to the same memory domain, or afforded some other similar treatment. In some cases, the group designation may permit elements to be separated at runtime when the group cohesiveness may be weak, but may otherwise attempt to keep the group together.

Figure 7:
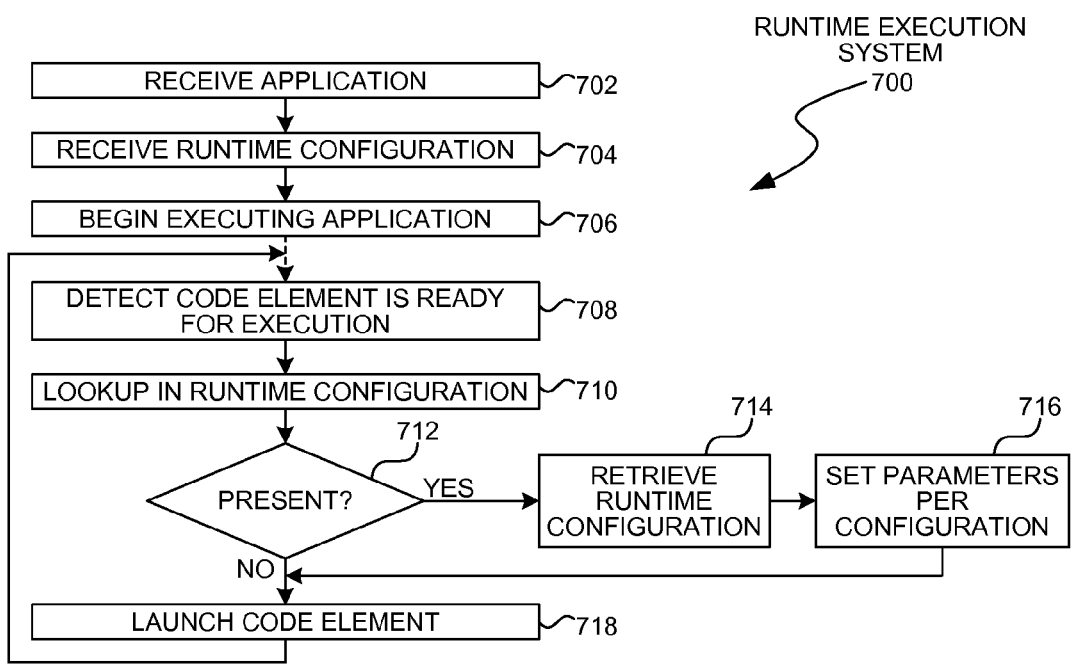
FIG. 7 is a flowchart illustration of an embodiment showing a method for a runtime execution system.

FIG. 7 is a flowchart illustration of an embodiment 700 showing a method using runtime configuration as an application executes. The operations of embodiment 700 may illustrate one method that may be performed by the runtime environment 116 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 700 illustrates one example of how optimized runtime configuration may be applied. Embodiment 700 may be an example of an interpreted or compiled runtime environment that may identify when a code element may be executed, then look up and apply a setting to the code element.

An application may be received in block 702, and a runtime configuration may be received in block 704. Execution of the application may begin in block 706.

While the code executes, block 708 may detect that a code element is about to be executed. The code element may be looked up in the runtime configuration in block 710. When the code element is present in the runtime configuration in block 712, the settings may be retrieved in block 714 and any configuration changes made in block 716. The code element may be launched in block 718. If the code element is not found in the runtime configuration in block 712, the code element may be launched in block 718 with default settings.

Some embodiments may apply the same runtime configuration settings to each instance of a code element. Other embodiments may apply one set of runtime configuration settings to one instance and another set of runtime configuration settings to another instance. Such embodiments may evaluate the input parameters to a code element to determine which set of settings to apply. Some such embodiments may evaluate other external parameters or settings to identify conditions for when to apply optimized configuration settings.

Figure 8:
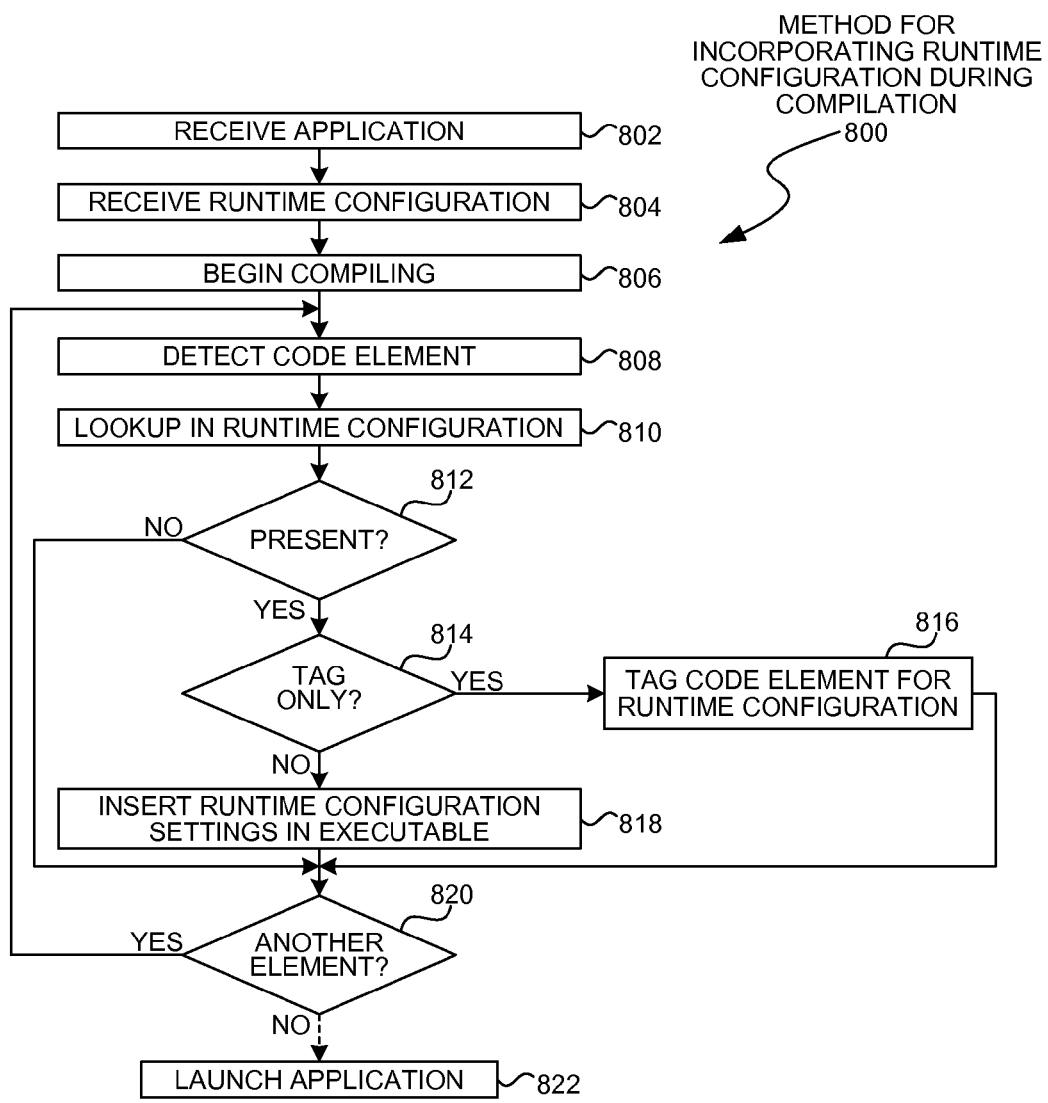
FIG. 8 is a flowchart illustration of an embodiment showing a method for incorporating runtime configuration during compilation.

FIG. 8 is a flowchart illustration of an embodiment 800 showing a method for incorporating runtime configuration during compiling.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 800 may illustrate one method by which runtime configuration may be incorporated into a compiled version of an application. In one mechanism, the compiled version of an application may be tagged. A tag may cause a runtime environment to identify that a code element has optimized settings available, which may cause the settings to be retrieved and implemented.

In another mechanism of incorporation using a compiler, the optimized runtime configuration settings may be placed into the runtime executable by the compiler. Such settings may be added to the compiled code such that the execution may be performed without a runtime configuration.

The compilation may be performed as a just in time compilation. In a typical embodiment, an application may be compiled into an intermediate language, which may be compiled at runtime. In other embodiments, the compilation may be performed prior to execution and the executable code may be stored and retrieved prior to execution.

An application may be received in block 802 and the runtime configuration received in block 804. Compiling may begin in block 806.

A code element may be detected in block 808 and a lookup may be performed in block 810 to determine whether or not the runtime configuration may contain settings for the code element. When the settings are not present in block 812, the process may skip to block 820. If more elements are present in block 820, the process may return to block 808.

When the settings are present in block 812, the runtime configuration may be added to the executable in two manners. In a tagging manner in block 814, the executable code may be tagged in block 816 to have a lookup performed during execution. In a non-tagging manner in block 814, the runtime configuration settings may be inserted into the executable code in block 818.

The process may revert to block 808 if more elements exist in block 820. When all the elements have been compiled in block 820, the application may be launched in block 822.

Figure 9:
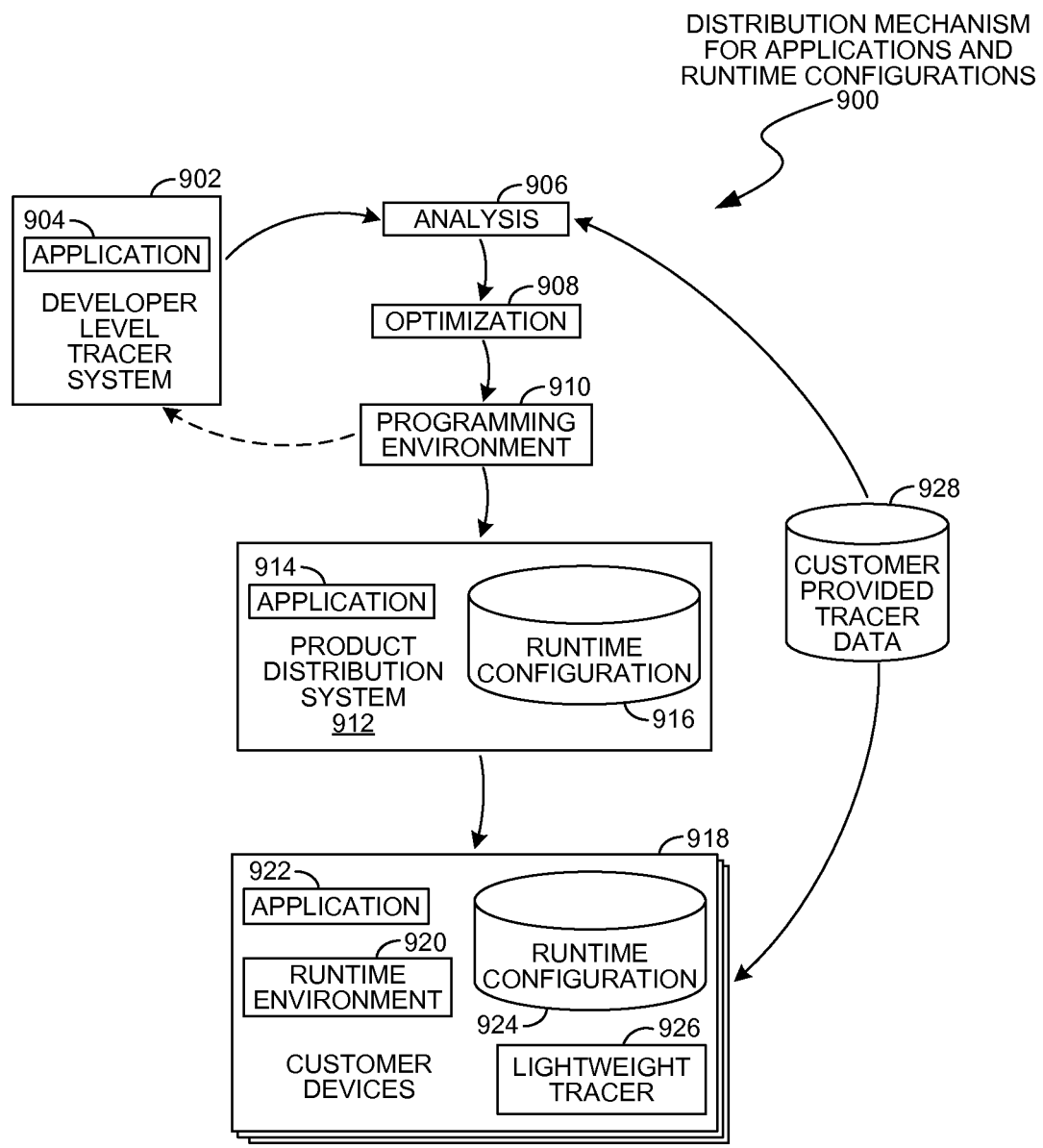
FIG. 9 is a diagram illustration of an embodiment showing a process for developing and distributing applications.

FIG. 9 is a diagram illustration of an embodiment 900 showing one development and distribution mechanism for applications with runtime configurations. Embodiment 900 illustrates one system for using network analysis in an offline mode, then distributing an application with a runtime configuration to client devices.

A developer-level tracing system 902 may execute an application 904, from which analysis 906 and optimization 908 may be performed on the tracer data. The results of the analysis 906 and optimization 908 may be displayed in a programming environment 910. A programmer may view the results in the programming environment 910 and may update or change the application 904, then re-run the analysis and optimization.

In some embodiments, the programming environment 910 may include an editor, compiler, and other components. In some cases, the developer level tracer 902 and the analysis and optimization components may be parts of the programming environment.

Once the changes to the application may be complete, a product distribution system 912 may distribute the application 914 and runtime configuration 916 to various customer devices 918.

The customer devices 918 may have a runtime environment 920 that executes the application 922 with a runtime configuration 924. In some embodiments, a lightweight tracer 926 may collect some data that may be transmitted as customer provided tracer data 928, which may be incorporated back into the development process.

Figure 10:
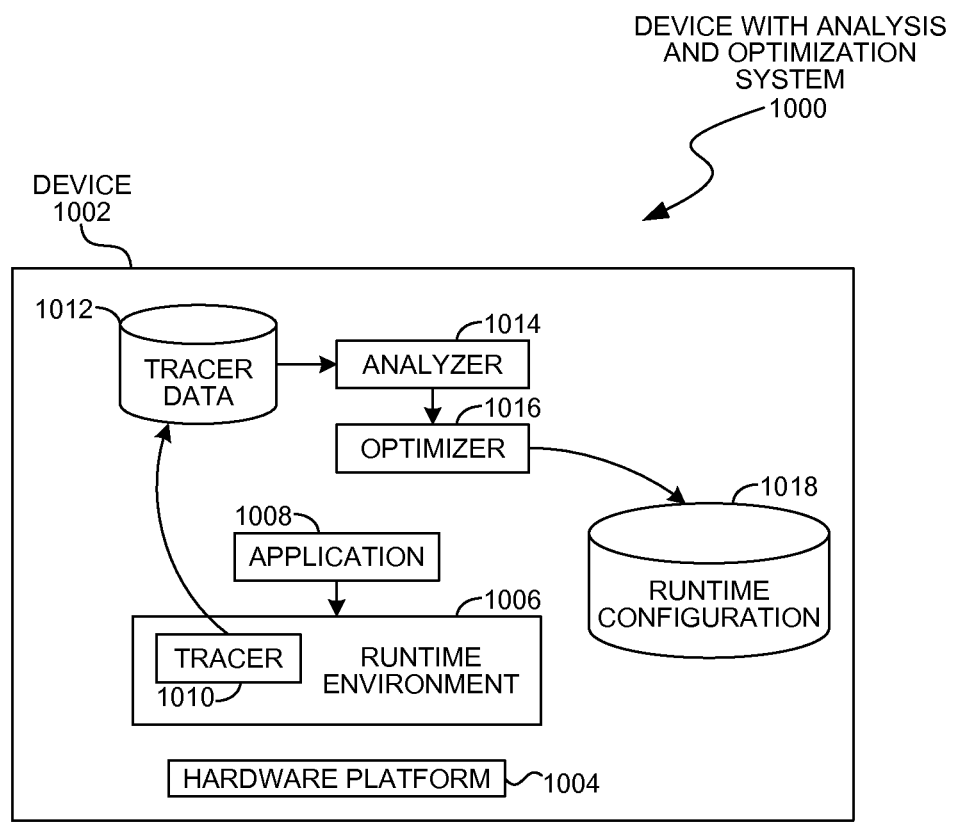
FIG. 10 is a diagram illustration of an embodiment showing a device with self-learning and self-optimizing execution of an application.

FIG. 10 is a diagram illustration of an embodiment 1000 showing a single device in which tracing, analysis, optimization, and execution of an application may occur. Embodiment 1000 may be a self-contained device that may learn or adapt to executing a particular application faster or with better resource utilization.

A device 1002 may contain a hardware platform 1004 on which a runtime environment 1006 may execute an application 1008. While the application 1008 executes, a tracer 1010 may collect tracer data 1012. An analyzer 1014 and optimizer 1016 may process the tracer data 1012 to generate a runtime configuration 1018. The runtime configuration 1018 may then be used to execute the application 1008. In some embodiments, a feedback loop may then again trace the application and continually refine the runtime configuration 1018, thereby continually improving the application.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A computer-implemented method for optimizing runtime execution of an application based on tracer data, the computer-implemented method being performed by one or more processors executing computer executable instructions for the computer-implemented method, and the computer-implemented method comprising:
    tracing an application and gathering performance data for identifying a plurality of code elements related to said application;
    gathering and storing tracer data for the plurality of code elements, the tracer data comprising:
        performance data for one or more of the identified plurality of code elements; and
        relationship data for one or more of the identified plurality of code elements;
    based on the stored tracer data, generating a network representation for the plurality of code elements, the network representation comprising:
        nodes representing code elements; and
        edges that connect the plurality of nodes in various ways, the edges representing relationships between connected code elements;
    analyzing said network representation and identifying as a result of the analysis one or more node patterns of a set of pre-determined node patterns in which at least three or more code elements interact with one another, wherein the identified node patterns indicate specific classifications for their constituent code elements of the identified node patterns, and wherein the specific classification indicates which of various optimization algorithms to apply to a given code element of interest;
    applying the indicated algorithms to the respective code elements of interest to generate a runtime configuration that applies runtime setting to the code elements;
    storing the runtime configuration; and
    using the runtime configuration for the application when running the application in a runtime environment.

2. The computer-implemented method of claim 1, wherein the gathered and stored tracer data that comprises performance data further comprises any or any combination of the following:
    identifying one or both of wait states and locks;
    identifying memory usage;
    identifying message passing relationships; and
    identifying shared memory relationships.

3. The computer-implemented method of claim 2, wherein at least one identified message passing relationship or shared memory relationship is directional.

4. The computer-implemented method of claim 3, wherein directionality of an identified shared memory relationship is indicated when one code element depends on another code element.

5. The computer-implemented method of claim 1, wherein the performance data comprises resource consumption data.

6. The computer-implemented method of claim 5, wherein the resource consumption data comprises processor utilization.

7. The computer-implemented method of claim 6, wherein at least one of the optimization algorithms identified comprise a set of processor settings, and wherein:
    said set of processor settings comprise a first set of settings for a first instance of a first code element of interest, and second set of settings for a second instance of the first code element of interest; and
    said first instance of the first code element of interest is defined by a first set of input parameters and said second instance of the first code element of interest is defined by a second set of input parameter.

8. The computer-implemented method of claim 1, wherein gathering and storing tracer data that comprises relationship data further comprises:
    collecting operational data;
    summarizing the collected operational data; and
    using the summarized operational data that is collected to characterize the relationship data.

9. The computer-implemented method of claim 1, wherein one or more of the gathered and stored tracer data that comprises performance data and relationship data is, prior to generating and analyzing the network representation, used to classify one or more code elements or one or more relationships between code elements, or both.

10. The computer-implemented method of claim 9, wherein one or more relationships between code elements is classified as one of the following:
    a strong relationship which represents large amounts of shared data or many messages being passed between code elements connected by the strong relationship; and
    a weak relationship which represents little shared data or few messages being passed between code elements connected by the weak relationship.

11. The computer-implemented method of claim 1, wherein the one or more identified node patterns and the particular node pattern on which the one or more identified optimizations is based comprise any or any combination of the following:
    a pipeline node pattern;
    a parallel node pattern;
    a cluster node pattern; and
    a star node pattern.

12. The computer-implemented method of claim 11, wherein for one or more node patterns or one or more code elements of a node pattern, or both, the following is performed for each identified optimization:
    identifying process allocation and scheduler settings;
    identifying memory allocation settings; and
    storing the identified process allocation, scheduler and memory settings in a runtime configuration.

13. A computer program product comprising a computer storage device containing computer-executable instructions for a computer-implemented method for optimizing runtime execution of an application based on tracer data, the computer-implemented method being performed by one or more processors executing the computer executable instructions, and wherein the computer-implemented method comprises:

tracing an application and identifying a plurality of code elements related to said application;

gathering and storing tracer data for the plurality of code elements, the tracer data comprising:

performance data for one or more of the identified plurality of code elements; and relationship data for one or more of the identified plurality of code elements;

based on the stored tracer data, generating a network representation for the plurality of code elements, the network representation comprising:

nodes representing code elements; and edges that connect the plurality of nodes in various ways, the edges representing relationships between connected code elements;

analyzing said network representation and identifying as a result of the analysis one or more node patterns of a set of pre-determined node patterns in which at least three or more code elements interact with one another, and wherein the identified node patterns indicate specific classifications for constituent code elements of the identified node patterns, and wherein the specific classification indicates which of various optimization algorithms to apply to a given code element of interest;

applying the indicated algorithms to the each respective code element of interest to generate a runtime configuration that applies runtime settings to the code elements;

storing the runtime configuration; and using the runtime configuration for the application when running the application in a runtime environment.

14. The computer program product of claim 13, wherein the gathered and stored tracer data that comprises performance data further comprises any or any combination of the following:

identifying one or both of wait states and locks;

identifying memory usage;

identifying message passing relationships; and identifying shared memory relationships.

15. The computer program product of claim 14, wherein at least one identified message passing relationship or shared memory relationship is directional.

16. The computer program product of claim 15 wherein directionality of an identified shared memory relationship is indicated when one code element depends on another code element.

17. The computer program product of claim 13, wherein the performance data comprises resource consumption data.

18. The computer program product of claim 17, wherein the resource consumption data comprises processor utilization.

19. The computer program product of claim 18, wherein at least one of the optimization algorithms identified comprise a set of processor settings, and wherein:

said set of processor settings comprise a first set of settings for a first instance of a first code element of interest, and second set of settings for a second instance of the first code element of interest; and said first instance of the first code element of interest is defined by a first set of input parameters and said second instance of the first code element of interest is defined by a second set of input parameter.

20. The computer program product of claim 13, wherein gathering and storing tracer data that comprises relationship data further comprises:

collecting operational data;

summarizing the collected operational data; and using the summarized operational data that is collected to characterize the relationship data.

21. The computer program product of claim 13, wherein one or more of the gathered and stored tracer data that comprises performance data and relationship data is, prior to generating and analyzing the network representation, used to classify one or more code elements or one or more relationships between code elements, or both.

22. The computer program product of claim 21, wherein one or more relationships between code elements is classified as one of the following:

a strong relationship which represents large amounts of shared data or many messages being passed between code elements connected by the strong relationship; and a weak relationship which represents little shared data or few messages being passed between code elements connected by the weak relationship.

23. A computer computing system comprising:

one or more processors;

a computer memory device containing computer-executable instructions for a computer-implemented method for optimizing runtime execution of an application based on tracer data, the computer-implemented method being performed by one or more processors executing the computer executable instructions, and wherein the computer-implemented method comprises:

tracing an application and identifying a plurality of code elements related to said application;

gathering and storing tracer data for the plurality of code elements, the tracer data comprising:

performance data for one or more of the identified plurality of code elements; and relationship data for one or more of the identified plurality of code elements;

based on the stored tracer data, generating a network representation for the plurality of code elements, the network representation comprising:

nodes representing code elements; and edges that connect the plurality of nodes in various ways, the edges representing relationships between connected code elements;

analyzing said network representation and identifying as a result of the analysis one or more node patterns of a set of pre-determined node patterns in which at least three or more code elements interact with one another, and wherein the identified patterns indicate specific classifications for constituent code elements of the identified node patterns, and wherein the specific classification indicates which of various optimization algorithms to apply to a given code element of interest;

applying the indicated algorithms to each respective code element of interest to generate a runtime configuration that applies runtime settings to the code elements;

storing the runtime configuration; and using the runtime configuration for the application when running the application in a runtime environment.

24. The computer system of claim 23, wherein the gathered and stored tracer data that comprises performance data further comprises any or any combination of the following:
    identifying one or both of wait states and locks;
    identifying memory usage;
    identifying message passing relationships; and
    identifying shared memory relationships.

25. The computer system claim 24, wherein at least one identified message passing relationship or shared memory relationship is directional.

26. The computer system claim 25, wherein directionality of an identified shared memory relationship is indicated when one code element depends on another code element.

27. The computer system claim 23, wherein the performance data comprises resource consumption data.

28. The computer system claim 27, wherein the resource consumption data comprises processor utilization.

29. The computer system claim 28, wherein at least one of the optimization algorithms identified comprise a set of processor settings, and wherein:
    said set of processor settings comprise a first set of settings for a first instance of a first code element of interest, and second set of settings for a second instance of the first code element of interest; and
    said first instance of the first code element of interest is defined by a first set of input parameters and said second instance of the first code element of interest is defined by a second set of input parameter.

30. The computer system claim 23, wherein gathering and storing tracer data that comprises relationship data further comprises:
    collecting operational data;
    summarizing the collected operational data; and
    using the summarized operational data that is collected to characterize the relationship data.

31. The computer system of claim 23, wherein one or more of the gathered and stored tracer data that comprises performance data and relationship data is, prior to generating and analyzing the network representation, used to classify one or more code elements or one or more relationships between code elements, or both.

32. The computer system of claim 31, wherein one or more relationships between code elements is classified as one of the following:
    a strong relationship which represents large amounts of shared data or many messages being passed between code elements connected by the strong relationship; and
    a weak relationship which represents little shared data or few messages being passed between code elements connected by the weak relationship.

* * * * *